US011814846B1

(12) United States Patent
McDonald

(10) Patent No.: US 11,814,846 B1
(45) Date of Patent: *Nov. 14, 2023

(54) METHODS OF FORMING A LEAKPROOF PITCHED ROOF SECTION OR WALL WITH THE USE OF SOLAR PANELS

(71) Applicant: Practical Renewables Racking Inc., Sealy, TX (US)

(72) Inventor: Kenneth R. McDonald, Sealy, TX (US)

(73) Assignee: Practical Renewables Racking, Inc., Sealy, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,896

(22) Filed: Sep. 16, 2022

Related U.S. Application Data

(63) Continuation of application No. 16/891,894, filed on Jun. 3, 2020, now Pat. No. 11,447,954.

(60) Provisional application No. 62/857,457, filed on Jun. 5, 2019.

(51) Int. Cl.
| | |
|---|---|
| *E04D 3/36* | (2006.01) |
| *E04D 3/366* | (2006.01) |
| *E04B 7/08* | (2006.01) |
| *H02S 30/10* | (2014.01) |
| *H02S 20/23* | (2014.01) |
| *E04D 12/00* | (2006.01) |

(52) U.S. Cl.
CPC .............. *E04D 3/366* (2013.01); *E04B 7/08* (2013.01); *E04D 12/00* (2013.01); *H02S 20/23* (2014.12); *H02S 30/10* (2014.12)

(58) Field of Classification Search
CPC . E04D 3/366; E04D 12/00; E04B 7/08; H02S 20/23; H02S 30/10
See application file for complete search history.

(56) References Cited

U.S. PATENT DOCUMENTS

| | | | | |
|---|---|---|---|---|
| 4,336,413 | A * | 6/1982 | Tourneux ................ | H02S 20/23 52/173.3 |
| 9,273,885 | B2 * | 3/2016 | Rodrigues ............... | F24S 25/20 |
| 9,279,415 | B1 * | 3/2016 | Huber ..................... | H02S 20/30 |
| 11,447,954 | B2 * | 9/2022 | McDonald .............. | E04B 7/08 |
| 2004/0216399 | A1 * | 11/2004 | Yamada .................. | F24S 25/20 52/173.1 |
| 2010/0236183 | A1 * | 9/2010 | Cusson ................... | H02S 20/30 52/645 |
| 2011/0314752 | A1 * | 12/2011 | Meier ..................... | F24S 25/20 52/173.3 |
| 2012/0240490 | A1 * | 9/2012 | Gangemi ............... | F24S 25/632 52/173.3 |
| 2014/0041321 | A1 * | 2/2014 | Poivet ................. | H01L 31/0521 52/173.3 |
| 2014/0299177 | A1 * | 10/2014 | Sha ........................ | H02S 20/23 136/251 |
| 2017/0019059 | A1 * | 1/2017 | Higuchi ................. | F24S 25/20 |

(Continued)

*Primary Examiner* — Beth A Stephan
(74) *Attorney, Agent, or Firm* — E. Randall Smith; E. Randall Smith, P.C.

(57) ABSTRACT

A method of forming a leakproof pitched wall or roof section with the use of solar panels includes arranging the solar panels in rows so that at least one panel on the second row is offset upwardly relative to at least one panel on the first row. Seals are provided to prevent the leakage of liquid through the pitched wall or roof section formed by the solar panels.

20 Claims, 10 Drawing Sheets

(56) References Cited

U.S. PATENT DOCUMENTS

| | | | |
|---|---|---|---|
| 2017/0040929 A1* | 2/2017 | Ting | F24S 25/37 |
| 2018/0234048 A1* | 8/2018 | Schmorde | F24S 25/10 |
| 2020/0091856 A1* | 3/2020 | Wakeman | E04D 3/02 |

* cited by examiner

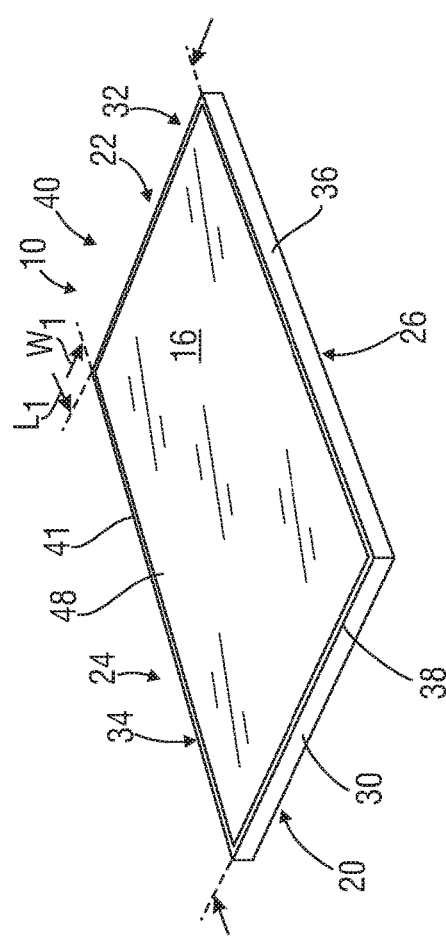

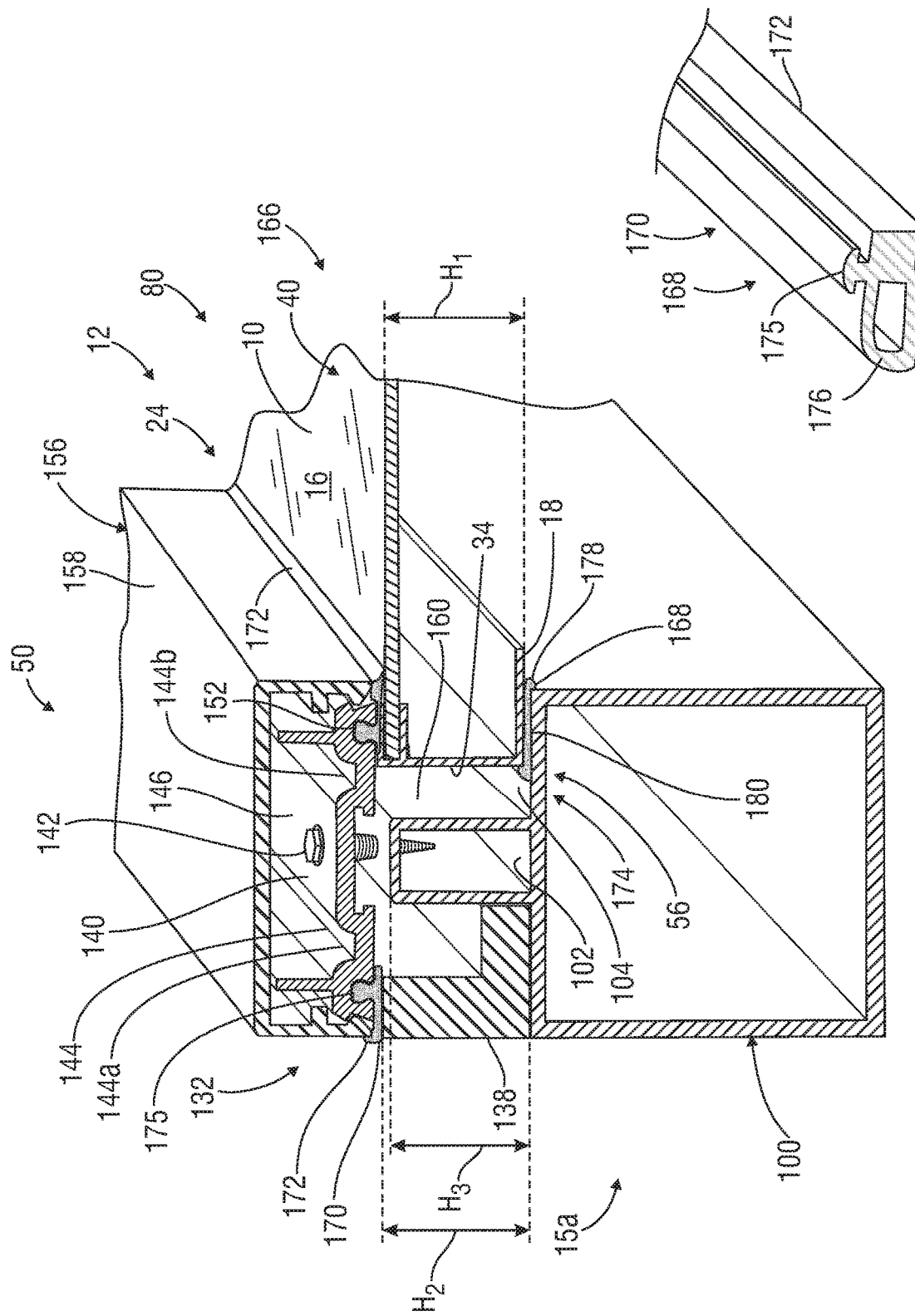

METHODS OF FORMING A LEAKPROOF PITCHED ROOF SECTION OR WALL WITH THE USE OF SOLAR PANELS

The present application is a continuation of and claims priority to U.S. patent application Ser. No. 16/891,894 to McDonald, filed on Jun. 3, 2020 and issued as U.S. Pat. No. 11,447,954 on Sep. 20, 2022, which claims priority to U.S. Provisional Patent Application Ser. No. 62/857,457 filed on Jun. 5, 2019 and entitled "System, Apparatus & Methods for Mounting Panels", the entire contents of which are hereby incorporated by reference herein.

FIELD OF THE DISCLOSURE

The present disclosure relates generally to mounting panels upon, or to form, at least part of a pitched roof, wall or other structure. In certain embodiments, the present disclosure relates to systems, apparatus and methods for forming a leakproof roof, wall or other structure that includes solar panels.

BACKGROUND

Mounting panels upon, or to form, a pitched roof, wall or other structure may involve any variety of considerations and challenges. Depending upon the situation, some example possible considerations and challenges are ease of mounting and removal of the panels, aesthetic appearance, providing proper grounding (e.g., solar panels), weather and/or leak resistance and wind tolerance. In some cases, it may be desirable to be able to easily remove single panels, such as for maintenance or replacement, and/or provide a leakproof structure.

In the use of solar panels, for example, existing techniques are believed to have one or more limitations. Solar panel mounting systems are typically not leakproof and rely on the underlying substructure (e.g., roof) to provide weatherproofing. In many cases, the solar panels are not mounted in a manner that encourages rainwater and other liquids to shed, or flow, easily off the assembled structure or to prevent the leakage thereof between the panels and through the structure. In some instances, the panels are not mounted on a framework dedicated to supporting the panels and/or which can be easily assembled and disassembled. For another example, various existing systems and techniques cover, or obstruct, a good portion of the surface area of the light-receiving elements of the solar panel and thus sacrifice some of the critical functionality of the panels. For still a further example, many existing solar panel mounting techniques and systems have externally visible connectors or do not allow for individual panels and/or the supporting structure therefor to be easily or individually removed.

Accordingly, there exists a need for improved systems, apparatus and methods useful for mounting panels on, or to form, a pitched roof, wall or other structure. Such improved systems, apparatus and methods may have one or more of the attributes or capabilities listed below, as described or shown in other portions of this patent or as may be apparent therefrom: a panel mounting system that can accommodate different sizes (length, width, thickness) of panels; panels may be organized in a stepped fashion; successive rows of panels may be vertically offset relative to each other; panels may not overlap or obstruct one another; the top faces and front edges of panels may be substantially, or entirely, uncovered and unblocked; solar panels may be arranged in vertically-offset, but not overlapping, rows and without, more than minimally, covering or obstructing the photovoltaic portions thereof; a panel support framework may be mounted onto the underlying substructure and panels secured to the framework; the panels and/or panel support framework members may be individually removable and replaceable; a panel support framework useful for mounting panels as desired may be custom-sized to accommodate different sizes of panels and/or roofs, walls or other structures; a panel support framework useful for mounting panels may include support beams that may be custom fabricated to support panels of any desired width, length and thickness; a panel attachment system and method may allow any type/shape/size of panels to be installed easier and at less cost (e.g., material and/or labor costs) to form a leakproof roof, wall or other structure with improved functionality (e.g., improved light reception or photoelectric effect of solar panels) as compared to other currently available systems; the panels may be mounted so that the resulting roof, wall or other structure is leakproof and without requiring the underlying substructure to be completed; every panel row may drain to the next lower panel row on the outside of the roof or other structure; panels may be arranged so that liquid may flow unimpeded from the top face of the panel(s) of a higher row, down over the front edge thereof, onto the top face of the panel(s) of the next lower row and so on until the liquid drops off the roof, wall or other structure; each edge of a panel may be provided at least two distinct seal mechanisms; each interface between a panel and panel support framework may include at least one seal; spaces or structures between adjacent panels may be sealed; each connection or joint between panels and a panel support framework may be sealed to eliminate water infiltration; panels may be mounted in a block pattern or any other (e.g., custom-shaped) configuration (e.g., with triangle-shaped corner panels) to form a leakproof structure; panels may be set in sealant at their edges around their entire peripheries; panels may be secured in position along one or more of their edges; clamps may secure panels along their side edges to a framework; the fasteners to hold down the panels may be hidden or not visible; a panel may be secured in place simply by clamping it to a rail on each side edge thereof; the panels may be mounted to form a smooth external appearance without visible fasteners; panels may be clamped down into sealant; or a combination thereof.

It should be understood that the above-described examples, disadvantages, limitations, features and capabilities are provided for illustrative purposes only and are not intended to limit the scope or subject matter of this disclosure or the appended claims. Thus, none of the appended claims should be limited by the above discussion or construed to address, include or exclude each or any of the above-cited examples, disadvantages, features and capabilities merely because of the mention thereof herein.

In some embodiments, methods of forming a leakproof pitched wall or roof section with solar panels on an underlying subframe having multiple spaced-apart subframe members is provided. Each solar panel has a top face, front face at a front edge thereof and rear face at a rear edge thereof, the top face meeting the front face at a transition. These methods include mounting a panel support framework onto at least some of the subframe members. A first row of solar panels is secured to the panel support framework closer to the lower end than the upper end of the subframe and extends angularly upwardly over part of the panel support framework. A second row of solar panels is secured to the panel support framework between the first row of solar panels and the upper end of the subframe and extends angularly upwardly over part of the panel support framework. The solar panels are (i) arranged so that at least one panel on the second panel row is offset upwardly relative to at least one solar panel on the first row and (ii) secured to the panel support framework without covering over 10% of the top face and transition of each solar panel. Seals are provided between the solar panels and panel support framework to prevent the leakage of liquid through the pitched wall or roof section formed by the solar panels. Liquid is allowed to flow unimpeded from the top face of at least one of the solar panels on the second panel row down onto the top face of at least one of the solar panels of the first panel row.

The present disclosure also includes embodiments of methods of forming a leakproof pitched wall or roof section with solar panels by mounting a panel support framework onto a subframe. The panel support framework includes at least first and second angularly-oriented support beams extending at least partially between the upper and lower ends of the subframe. The second angularly-oriented support beam is linearly aligned with and offset upwardly relative to the first angularly-oriented support beam in a stepped fashion. A first row of solar panels is secured to the panel support framework closer to the lower end than the upper end of the subframe and extends angularly upwardly over part of the panel support framework. A second row of solar panels is secured to the panel support framework between the first panel row and the upper end of the subframe and extends angularly upwardly over part of the panel support framework. Each panel row includes at least first and second solar panels, the first and second solar panels of each respective row being positioned side-by-side. A right side edge of the first solar panel and a left side edge of the second solar panel of the first panel row rest atop the first angularly-oriented support beam and a right side edge of the first solar panel and a left side edge of the second solar panel of the second panel row rest atop the second angularly-oriented support beam. At least one solar panel on the second panel row is offset upwardly relative to at least one solar panel on the first panel row in a stepped fashion. Seals are provided between the solar panels and panel support framework to prevent the leakage of liquid through the pitched wall or roof section formed by the solar panels. Liquid is allowed to flow unimpeded from a top face of at least one of the solar panels on the second panel row down onto a top face of at least one of the solar panels of the first panel row.

Various embodiments involve methods of forming a leakproof pitched wall or roof section with solar panels on an underlying subframe having multiple spaced-apart subframe members. Each solar panel has a front face at a front edge thereof, a rear face at a rear edge thereof and a top face meeting the front face at a transition and having one or more photovoltaic portions for receiving sunlight. These methods include mounting a panel support framework onto at least some of the subframe members. A plurality of clamps is used to releasably, securely clamp a first row of solar panels to the panel support framework closer to the lower end than the upper end of the subframe and to extend angularly upwardly over part of the panel support framework and a second row of solar panels to the panel support framework between the first panel row and the upper end of the subframe and to extend angularly upwardly over part of the panel support framework so that at least one solar panel on the second panel row is offset upwardly relative to at least one solar panel on the first panel row. The solar panels are secured to the panel support framework without covering or overlapping the transition or photovoltaic portion(s) of any of the solar panels. Seals are provided between the solar panels and panel support framework to prevent the leakage of liquid through the pitched wall or roof section formed by the solar panels. Liquid is allowed to flow unimpeded from the top face of at least one of the solar panels on the second panel row, down over the front edge of at least one of the solar panels on the second panel row and onto the top face of at least one of the solar panels of the first panel row.

In many embodiments, methods of forming a leakproof pitched wall or roof section with solar panels on an underlying subframe having multiple spaced-apart subframe members include mounting a panel support framework onto at least some of the subframe members. The panel support framework includes at least first and second angularly-oriented support beams, each angularly-oriented support beam extending partially between the upper and lower ends of the subframe. A first row of solar panels is secured to the panel support framework closer to the lower end than the upper end of the subframe and extends angularly upwardly over part of the panel support framework. A second row of solar panels is secured to the panel support framework between the first panel row and the upper end of the subframe so that at least one panel on the second panel row is offset upwardly relative to at least one solar panel on the first panel row. First and second solar panels of the first panel row are positioned side-by-side so that a right side-edge of the first solar panel and a left side-edge of the second solar panel are positioned over the first angularly-oriented support beam. Seals are provided between the solar panels and panel support framework to prevent the leakage of liquid through the pitched wall or roof section formed by the solar panels. The seals include at least one seal strip sandwiched at least partially between the first angularly-oriented support beam and a bottom face of the first solar panel of the first panel row along its right side-edge and at least one seal strip sandwiched at least partially between the first angularly-oriented support beam and a bottom face of the second solar panel of the first panel row along its left side-edge.

BRIEF SUMMARY OF THE DISCLOSURE

In some embodiments, the present disclosure involves methods of mounting at least two rows of panels onto an underlying structure to form at least part of a pitched roof or wall and allow the unimpeded flow of liquid, such as rainwater, down across the roof or wall. The underlying structure may be formed with upper and lower ends and left and right sides. The upper end of the underlying structure is higher than the lower end so that the pitched roof or wall may extend angularly downwardly atop and at least partially between the upper and lower ends of the underlying structure. At least one distinct panel is provided in each panel row and each panel includes top and bottom faces, front and rear edges and left and right side edges. These methods include mounting a panel support framework onto the underlying structure, the panel support framework being distinct from the panels and underlying structure. The first panel row is secured to the panel support framework closest to the lower end of the underlying structure and extends angularly upwardly therefrom over part of the panel support framework. The second panel row is secured to the panel support framework between the first panel row and the upper end of the underlying structure and extends angularly upwardly over part of the panel support framework. The panels are arranged so that each panel on the second row is offset upwardly relative to each panel on the first row in a stepped fashion and the panels do not cover or overlap one another. Liquid is allowed to flow unimpeded from the top face of panel(s) of the second panel row, down over the front edge thereof and onto the top face of the panel(s) of the second panel row.

In various embodiments, the present disclosure involves a system for mounting at least two rows of panels onto an underlying structure to form at least part of a pitched roof, wall or other structure(s) and allow the unimpeded flow of liquid, such as rainwater, down across the pitched roof or wall. The underlying structure may be formed with upper and lower ends and left and right sides, the upper end being higher than the lower end so that the pitched roof or wall may extend angularly downwardly atop and at least partially between the upper and lower ends of the underlying structure. At least one distinct panel is provided in each panel row. Each panel includes top and bottom faces, front and rear edges and left and right side edges. The system includes a panel support framework (e.g., that is distinct from the panels and underlying structure). The panel support framework may include at least first, second and third spaced-apart horizontal beams configured to extend over the underlying structure at least partially from the left to the right sides of the underlying structure and so that the first horizontal beam is closest to the lower end of the underlying structure, the second horizontal beam is situated between the first horizontal beam and the upper end of the underlying structure and the third horizontal beam is situated between the second horizontal beam and the upper end of the underlying structure.

The system of these embodiments also includes at least first and second rows of spaced-apart vertical beams each configured to extend partially between the upper and lower ends of the underlying structure so that the first row of vertical beams extends between the first and second horizontal beams and the second row of vertical beam extends between the second and third horizontal beams. Each vertical beam includes at least one panel mounting surface upon which at least part of at least one panel may be supported so that the first panel row can be supported on the first row of vertical beams and the second panel row can be supported on the second row of vertical beams. The front edge of each panel on the second panel row is positioned proximate to the rear edge of at least one panel on the first panel row and none of the panels cover, or overlap, any of the other panels. The vertical beams are configured to be arranged so that the vertical beams in each vertical beam row extend in a different longitudinal plane than the vertical beams in the other respective vertical beam rows. The longitudinal plane of each vertical beam in the second vertical beam row is offset upwardly relative to the longitudinal plane of each vertical beam in the first vertical beam row so that the second panel row will be offset upwardly relative to the first panel row and liquid may flow unimpeded from the top face of the panel(s) of the second panel row, down over the front edge thereof and onto the top face of the panel(s) of the first panel row.

The following features are optional depending upon the embodiment of the system and/or method. Each vertical beam may be rigidly, releasably coupled at each end to the respective adjacent horizontal beam with at least one U-shaped or L-shaped connector. At least some of the horizontal beams may be configured to rest at least partially upon the underlying structure and be rigidly, releasably coupled thereto with at least one coupler. Each panel may contact, or be releasably secured to, the panel support framework at, or proximate to, at least one interface and at least one seal may be disposed at, or proximate to, each interface to form a leakproof pitched roof or wall. In some embodiments, at least two seals may be provided at, or proximate to, each interface.

At least one elongated clamp may be positionable over at least one panel along at least part of one of the side edges thereof and releasably securable to one of the vertical beams to secure the panels to the panel support framework. At least one elongated seal may be sandwiched between each elongated clamp and each panel it secures to the panel support framework. When the top face of each panel meets the front face thereof at a transition, each elongated clamp may include a pressure plate extendable over substantially the entire side edge of each panel associated therewith without more than minimally obstructing or covering the top face and transition thereof. Each pressure plate may be releasably rigidly securable to the associated vertical beam and adjustably tightenable to secure each respective associated panel to the associated vertical beam.

First and second panel mounting surfaces of a first vertical beam may be configured to support the right side edge of a first panel and the left side edge of a second panel of the first panel row, respectively. First and second panel mounting surfaces of a second vertical beam may be configured to support the right side edge of a first panel and the left side edge of a second panel of the second panel row, respectively. The second vertical beam may be offset upwardly relative to the first vertical beam in a stepped fashion. A first elongated clamp may be configured to extend over at least part of the adjacent side edges of the first and second panels of the first panel row and be releasably coupled to the first vertical beam. A second elongated clamp may be configured to extend over at least part of the adjacent side edges of the first and second panels of the second panel row and be releasably coupled to the second vertical beam. First and second elongated seals may be sandwiched between the first elongated clamp and the first and second panels of the first panel row, respectively. Third and fourth elongated seals may be sandwiched between the second elongated clamp and the respective first and second panels of the second panel row. At least one seal strip may be sandwiched between the bottom face of the first panel of the first panel row, along its right side edge, and the first vertical beam. At least one seal strip may be sandwiched between the bottom face of the second panel of the first panel row, along its left side edge, and the first vertical beam. At least one seal strip may be sandwiched between the bottom face of the first panel of the second panel row, along its right side edge, and the second vertical beam. At least one seal strip may be sandwiched between the bottom face of the second panel of the second panel row, along its left side edge, and the second vertical beam.

Each horizontal beam may be positioned so that the rear face of each panel of the first panel row abuts the front face of the second horizontal beam and the front edge of each panel of the second panel row rests atop part of the second horizontal beam and spaced rearwardly of the front face of the second horizontal beam. The panels on the second panel row may be vertically offset upwardly from, and spaced rearwardly of, the panels on the first panel row. At least one seal strip may be sandwiched at least partially between the rear face of each respective panel on the first panel row and the front face of the second horizontally-oriented support beam. At least one seal strip may be sandwiched at least partially between bottom face of each respective panel on the second panel row and the second horizontally-oriented support beam. When at least one seam is formed between rear edge of each panel on the first panel row and the second horizontally-oriented support beam and/or at least one seam is formed between the front edge of each panel on the second panel row and the second horizontally-oriented support beam, a respective cap bead seal may be extended across each seam. At least one strip of flashing may be extended over the seam formed between the rear edge of each panel on the first panel row and the second horizontally-oriented support beam.

When the front face of a panel meets the top face thereof at a transition, a plurality of clamps may be used to secure the panels to the panel support framework. The clamps and panel support framework may be configured to position the panels to form at least part of the pitched roof or wall without more than minimally obstructing or covering the entire top and front faces of each panel and the transition of each panel along substantially the entire front edge thereof. Each clamp may be configured to clamp part of the frame of at least one solar panel to the panel support framework and the panels may be positioned by the clamps and support framework so that none of the panels covers or overlaps the photovoltaic portion(s) of any of the solar panels. A plurality of seals may be disposed between the panels and panel support framework to prevent the leakage of liquid down through the pitched roof or wall formed by the panels.

In some embodiments, the present disclosure involves systems, apparatus and methods for attaching panels on a slope in a way that allows no rainwater (and other liquid) penetration. The panels may be assembled to form a leakproof slope. These systems, apparatus and methods may include (e.g., aluminum) panel support members that can be custom-sized to support panels having any desired width, length and thickness. Multiple rows of panels may, for example, be arranged to maintain the integrity of the attachment while also managing water flow so no water infiltration occurs through the structure. Each row of panels may be arranged in a stepped fashion to allow water to be transferred from one row to the next. In some instances, panels can be attached to a support framework in a bed of sealant along their long edges by pressure plates and the short edges of the panels may be sealed to the framework with sealant and require no connectors.

Accordingly, the present disclosure includes features and advantages which are believed to enable it to advance panel mounting technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 3 is a perspective view of the exemplary solar panel shown in FIG. 1;

FIG. 4 is a perspective view of part of the exemplary panel support framework of the panel mounting system shown in FIG. 1;

FIG. 9 is a cross-sectional view of part of an exemplary leakproof roof taken on the far left side, and looking toward the ridge, of the roof and assembled in accordance with one or more embodiments of the present disclosure;

FIG. 11 is a perspective view of part of the exemplary elongated rubber seal shown in FIG. 9;

DETAILED DESCRIPTION OF PRESENTLY PREFERRED EMBODIMENTS

Figure 1:
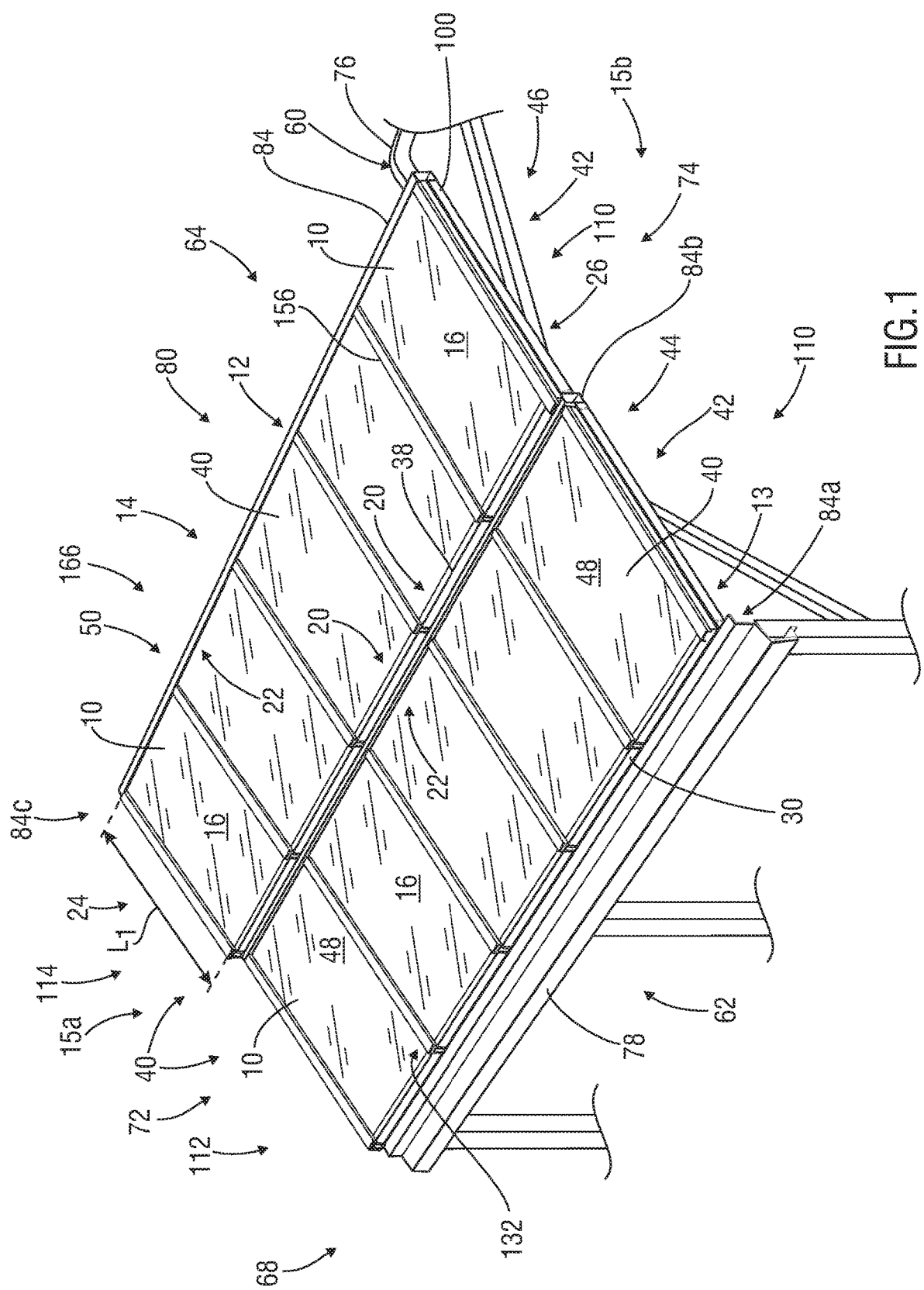
FIG. 1 is a perspective view of an exemplary roof portion of a car port having solar panels and assembled using an exemplary panel mounting system and method in accordance with one or more embodiments of the present disclosure.

Characteristics and advantages of the present disclosure and additional features and benefits will be readily apparent to those skilled in the art upon consideration of the following detailed description of exemplary embodiments and/or referring to the accompanying figures. It should be understood that the description herein and appended drawings, being of example embodiments, are not intended to limit the claims of this patent (or any patent or patent application claiming priority hereto). On the contrary, the intention is to cover all modifications, equivalents and alternatives falling within the spirit and scope of this disclosure and the relevant claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic.

As used herein and throughout various portions (and headings) of this patent (including the claims), the terms "invention", "present invention" and variations thereof are not intended to mean every possible embodiment encompassed by this disclosure or any particular claim(s). Thus, the subject matter of each such reference should not be considered as necessary for, or part of, every embodiment hereof, or of any particular claim(s), merely because of such reference.

Certain terms are used herein and in the appended claims to refer to particular components. As one skilled in the art will appreciate, different persons may refer to a component by different names, and this document does not intend to distinguish between components that differ in name but not function. Also, the terms "including" and "comprising" are used herein and in the appended claims in an open-ended fashion, and thus should be interpreted to mean "including, but not limited to . . . ". The use of "(s)" in reference to an item, component or action (e.g., "surface(s)") throughout this patent should be construed to mean "at least one" of the referenced item, component or act. Further, reference herein and in the appended claims to components, feature, actions, aspects, etc. in a singular tense does not limit the present disclosure or appended claims to only one such component feature, action, aspect, etc., but should be interpreted to mean one or more, except and only to the extent as may be expressly specified otherwise herein or in a particular claim hereof and only for such claim(s) and any claim(s) depending therefrom.

As used throughout this patent, the following terms have the following meanings, except and only to the extent as may be expressly specified otherwise:

The terms "approximately" and variations thereof means within a range of deviation of 10% of the referenced parameter, variable, value, event etc.

The terms "elongated" and variations thereof as used herein mean, include and refer to an item having an overall length (during the intended use of the item) that is greater than its average width.

The terms "generally", "substantially" and variations thereof as used herein mean and include as much as or 100% of the referenced parameter, variable, value, event etc. and as little as approximately 90% thereof.

The terms "minimally" and variations thereof mean no more than approximately 5%.

The terms "coupled", "connected", "engaged" and the like, and variations thereof mean either an indirect or direct connection or engagement. Thus, if a first device couples to a second device, that connection may be through a direct connection, or through an indirect connection via other devices and connections.

The terms "rigidly coupled", "rigidly connected", "rigidly engaged" and variations thereof mean connected together in a manner that is intended not to allow relative movement therebetween during typical or expected use. In other words, if components A and B are rigidly coupled together, they should not move relative to one another during typical or expected operations.

Any component identified as a "plate" herein includes, but is not limited to, a plate as that term is commonly understood (e.g., a thin, flat sheet or strip of metal or other material, typically used to join or strengthen things or forming part of a machine), but may include non-planar surfaces (e.g., may be a curved or curvilinear-shaped member, housing, cone, sleeve, flange, collar etc.), not be thin per se, have any other form suitable for use in the particular configuration in which it is used, be comprised of multiple parts or a combination thereof.

It should be noted that any of the above terms may be further explained, defined, expanded or limited below or in other parts of this patent. Further, the above list of terms is not all inclusive, and other terms may be defined or explained below or in other sections of this patent.

Referring initially to FIG. 1, embodiments of systems, apparatus and methods for mounting panels 10 upon, or to form, at least part of a pitched roof, or wall, 12 will now be described. As used throughout this patent, the terms "panel" and variations thereof refer to a sealed or leakproof section of one or more materials and/or components that can be used as an exterior part of a roof and which is, except and only to the extent as may be expressly specified otherwise. In many embodiments, the panel may possess properties that provide good adhesion for sealants, such as silicone caulk. As used throughout this patent, the terms "roof", "wall" and variations thereof mean and include an entire pitched roof, wall or other structure, or one or more portions thereof. The terms "roof" and "wall" are thus used herein a catchall to encompass any at least partially pitched structure (e.g., single or dual pitch roof) formed by the panels 10 or upon which the panels 10 are mounted in accordance with this patent. Further, the distinction between whether the panels 10 are used to form the roof, wall or other structure, or are mounted thereupon is of little or no consequence to many embodiments of the present disclosure. Thus, for reader's convenience, any reference herein to "forming the roof", "forming the wall" and variations thereof incorporate (i) both forming or being mounted upon (ii) at least part of a roof, wall or other structure. Accordingly, the actual structure being formed with the panels 10 or upon which the panels 10 are mounted, whether it be an entirely, or partially, pitched roof, wall or other structure, is not limiting upon the present disclosure, appended claims and claims of any patent claiming priority hereto, except and only to the extent as may be expressly specified otherwise, such as in a particular claim and only for such claim(s) and claim(s) depending therefrom.

Figure 2:
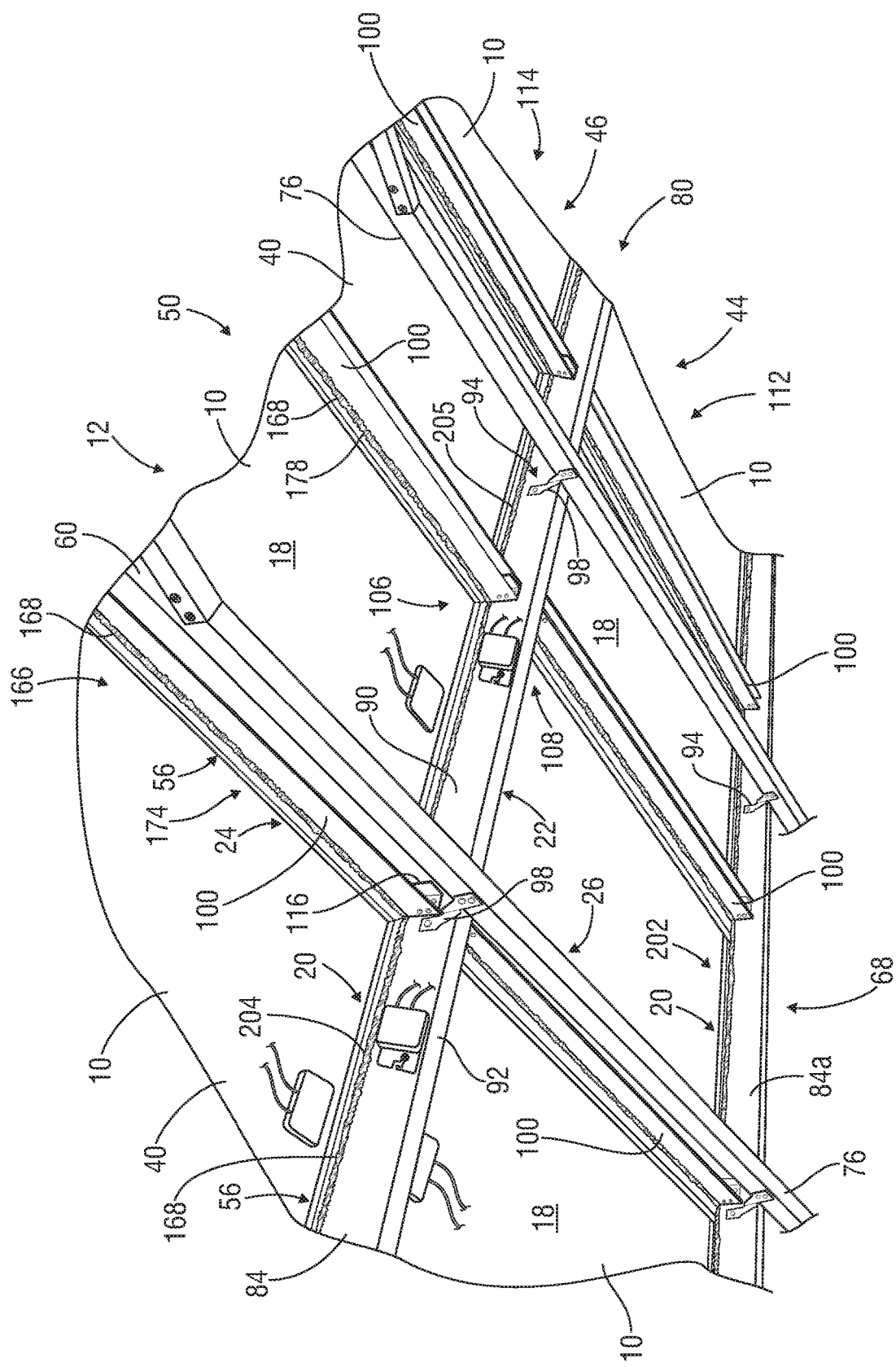
FIG. 2 is a perspective view of the underside of part of the exemplary roof shown in FIG. 1.

The panels 10 may be of any desired type and have any desired form, configuration and construction. In this example, the panels 10 are rectangular, but could be formed in any other desired shape, such as triangular, square, pentagonal, hexagonal, heptagonal, octagonal, etc., or a hybrid variation thereof. As shown in FIGS. 1-3, each illustrated panel 10 includes respective top and bottom faces 16, 18, front and rear ends 20, 22 (also referred to herein as front and rear "edges") and left and right side edges 24, 26. It should be noted that references to any direction and directional modifiers herein are made as viewed when looking from the lower end 13 of the roof 12 toward the ridge 14. Thus, the front of the roof 12 is at its lower end 13 and the rear of the roof 12 is at its ridge 14. The front of a component typically faces the lower end 13 of the roof 12 (and lower end 68 of the underlying structure 60) and rear of a component typically faces to the ridge 14 of the roof 12 (and upper end 64 of the underlying structure 60). The front and rear edges 20, 22 of each exemplary panel 10 incorporate the front and rear faces 30, 32 thereof, respectively, and the left and right side edges 24, 26 incorporate the respective left and right side faces 34, 36 of the panel 10. Finally, the top face 16 meets the front face 30 of each panel 10 at a transition 38 (e.g., a corner). As used throughout this patent, the term "top face" when referring to a panel 10, generally includes all external parts of the panel 10 that face or protrude upwardly when the panel 10 is mounted to form the roof 12, except and only to the extent as may be expressly specified otherwise. For example, a hypothetical panel 10 may include a pair of opposite-facing sheets of material mounted in a frame. In the context of this patent, the top face 16 of such hypothetical panel would include those portions of the frame and the top sheet which face upwardly. Likewise, the "bottom face" of a panel 10 generally includes all external parts of the panel 10 that face or protrude downwardly (when the panel 10 is mounted upon, or to form, the roof 12).

Still referring to FIGS. 1-3, different types, shapes, forms and configurations of panels 10 may be used on the same structure. For example, some or all of the panels 10 could be solar panels 40 as is and become further known. In the present embodiment, all of the panels 10 are rectangular, sealed, solar panels 40 (e.g., 3' x 5'). Each illustrated solar panel 40 includes a frame 41 (e.g., anodized aluminum) extending therearound and one or more photovoltaic portions 48 (e.g., including glass or other transparent or translucent) for receiving/processing sunlight. The top face 16 of the exemplary solar panel 40 thus includes part of the frame 41 and one or more photovoltaic portions 48. Some other examples of panels 10 are decorative panels, aluminum panels, roof panels, fiber-cement panels, glass panels, fiberglass panels, chrome, foam-core panels, wood panels or any combination thereof. However, the type, shape, configuration, construction and other details of the panels 10 are in no way limiting upon the present disclosure, appended claims and claims of any patent claiming priority hereto, except and only to the extent as may be expressly specified otherwise, such as in a particular claim and only for such claim(s) and claim(s) depending therefrom.

Referring again to FIG. 1, an exemplary panel mounting system 50 is shown used for mounting multiple rows 42 of panels 10 onto an underlying structure 60 to form the roof 12 in accordance with one or more embodiments of the present disclosure. In this example, two rows 42 of panels 10, a lower and an upper row 44, 46, are shown. Each illustrated row of panels 10 includes five panels 10, however, any desired number of rows 42 (e.g., one, three, four, five or more) may include any desired quantity of panels 10 (e.g., one, two, three, four, six or more). Thus, the number of panels 10 on each row 42 and the number of rows 42 is not limiting upon the present disclosure, appended claims and claims of any patent claiming priority hereto, except and only to the extent as may be expressly specified otherwise. In various embodiments, at least some of the panels 10 will be carried on or secured to, abut or engage the panel mounting system 50 at one or more joints, or interfaces, 56.

Now referring to FIGS. 1 & 2, the underlying structure 60 may have any desired form, configuration, construction and use. It may include a finished or unfinished roof, wall and/or other structures. In the appended figures, parts of the (e.g., galvanized steel) sub-frame 76 and trim 78 of the underlying structure 60 are shown. The illustrated underlying structure 60 has upper and lower ends 64, 68 and left and right sides 72, 74. The upper end 64 of the exemplary underlying structure 60 is higher than the lower end 68 so that the roof 12 can extend angularly downwardly at least partially therebetween. In this example, the underlying structure 60 is a car port 62, but could take any other form (e.g., garage, gazebo, building, interior wall or other structure, vehicle, trailer, hill, stand-alone structure). The exemplary panel mounting system 50 is shown used to mount panels 10 on one side of the car port 62, but could, of course, be used to provide panels 10 on both sides or any portions thereof. As with the panels 10 and roof 12, the underlying structure 60 is in no way limiting upon the present disclosure, appended claims and claims of any patent claiming priority hereto, except and only to the extent as may be expressly specified otherwise, such as in a particular claim and only for such claim(s) and claim(s) depending therefrom.

The exemplary panel mounting system 50 may have any suitable form, components, configuration and operation in order to support the panels 10. For example, the system 50 may include a panel support framework 80 (e.g., FIG. 4) configured to be mounted upon the underlying structure 60 and support the panels 10 so that the roof 12 formed thereby will extend angularly downwardly at least partially between the upper and lower ends 64, 68 of the underlying structure 60. In this embodiment, the first panel row 44 is secured to the panel support framework 80 closest to the lower end 68 thereof and extending angularly upwardly therefrom over part of the panel support framework 80 (and underlying structure 60). The illustrated second panel row 46 is secured to the panel support framework 80 between the first panel row 44 and the upper end 64 of the underlying structure 60 and extends angularly upwardly toward the upper end 64. However, in some embodiments, the panel mounting system 50 may not include a panel support framework 80, but instead use different components or arrangements of parts to support the panels 10 and/or for any other desired purpose(s).

Figure 5:
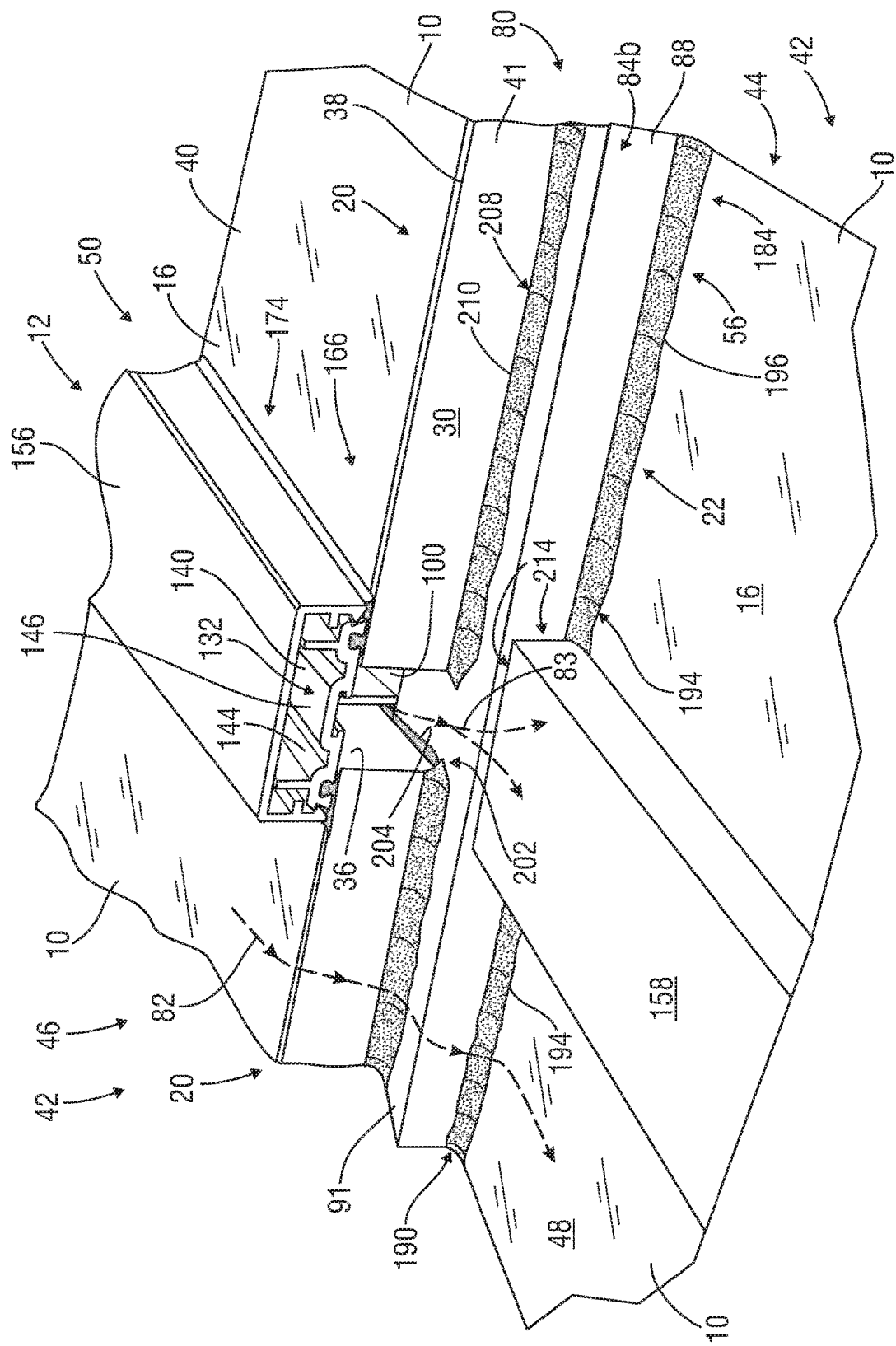
FIG. 5 is a perspective view of part of the middle of the exemplary roof of FIG. 1 showing two adjacent rows of panels mounted in the exemplary panel mounting system.

Referring now to FIGS. 1 & 5, the exemplary panel mounting system 50 may also position at least some of the panels 10 in a stepped, or vertically-offset, fashion relative to one another and/or position at least some of the panels 10 in an at least partially non-overlapping fashion relative to one another. As used there, the terms "offset" (e.g., vertically, upwardly, downwardly), "stepped" and variations thereof mean at least one referenced item is placed out of line heightwise (vertically), or extends at least partially in a different longitudinal plane, as compared to at least one other referenced item. And the terms "overlapping" and variations thereof mean at least one referenced item at least partially covers, rests upon or extends over or across at least part of at least one other referenced item. Accordingly, some embodiments may position (some or all) panels 10 in only a non-overlapping fashion, while other embodiments may position panels 10 in only a stepped fashion. Yet other embodiments may position at least some panels 10 in a non-overlapping fashion and at least some panels in a stepped fashion. In the present embodiment, the panel support framework 80 positions all the panels 10 so that each respective row 42 of panels is offset vertically relative to the adjacent rows 42 and none of the panels 10 overlap one another.

Still referring to FIGS. 1 & 5, if desired, the panel mounting system 50 may position panels 10 without (e.g., more than minimally) obstructing or covering the top face 16, front face 30 or transition 38 (or a combination thereof) of one or more panels 10 along (at least substantially) the entire front end 20 thereof. For example, the top face 16, front face 30 and transition 38 of each panel 10 may be unobstructed. In the present embodiment, the panel mounting system 50 positions the solar panels 40 so that none of the panels 10 covers, or overlaps, the photovoltaic portion(s) 48 of any of the solar panels 40 and substantially the entire top face 16, transition 38 and front face 30 of each panel 40 is exposed. The illustrated panel support framework 80 is configured to position the panels 10 so that each successive row 42 of panels 10 is vertically offset relative to its adjacent rows 42 of panel 10, and so that all the panels 10 do not overlap one another. For example, the adjacent panels 10 on each row 42 may be positioned side-by-side and each panel 10 on each lower row 42 (e.g., the first row 44) may be spaced apart from, and offset downwardly, relative to each panel 10 on the adjacent higher row 42 (e.g., second row 46). Any desired number panels 10 on any desired number of rows 42 could be similarly positioned in succession across the desired area to be covered.

Referring still to FIGS. 1 & 5, the system 50 may be configured to allow liquid to flow (e.g., arrows 82) from the top face 16 of panel(s) 10 on a higher panel row 42 (e.g., the second panel row 46), down over the front end, or edge, 20 thereof, (e.g., down a vertical and/or angled drop), onto the top face 16 of one or more panel(s) 10 on the next lower row 42 (e.g., first panel row 44) and ultimately off the roof 12. It should be noted, the flow path 82 may pass over other structure(s) and/or substances, such as one or more seals, the top face 91 of the intermediate horizontal member 84, etc. As used throughout this patent, the terms "liquid" and variations thereof mean and include rainwater, dew, snow and ice melt, ocean spray, moisture, any other liquid or any combination of liquids, solids and gasses.

Figure 6:
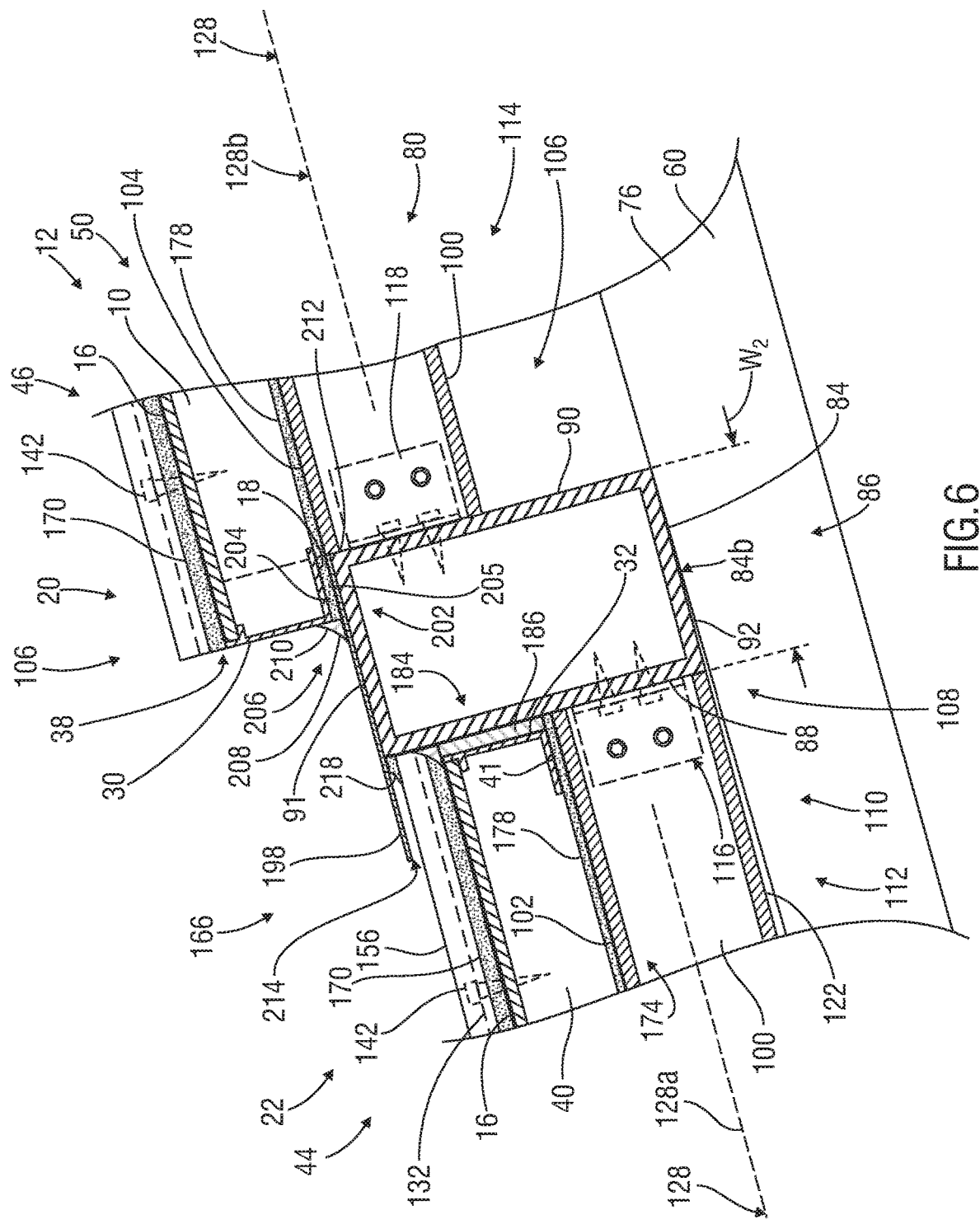
FIG. 6 is a cross-sectional view of part of an exemplary leakproof roof taken in the middle of the roof looking to the left, showing the intersection of two adjacent rows of panels in a vertically-offset relationship and assembled using an exemplary panel mounting system and method in accordance with one or more embodiments of the present disclosure.
Figure 7:
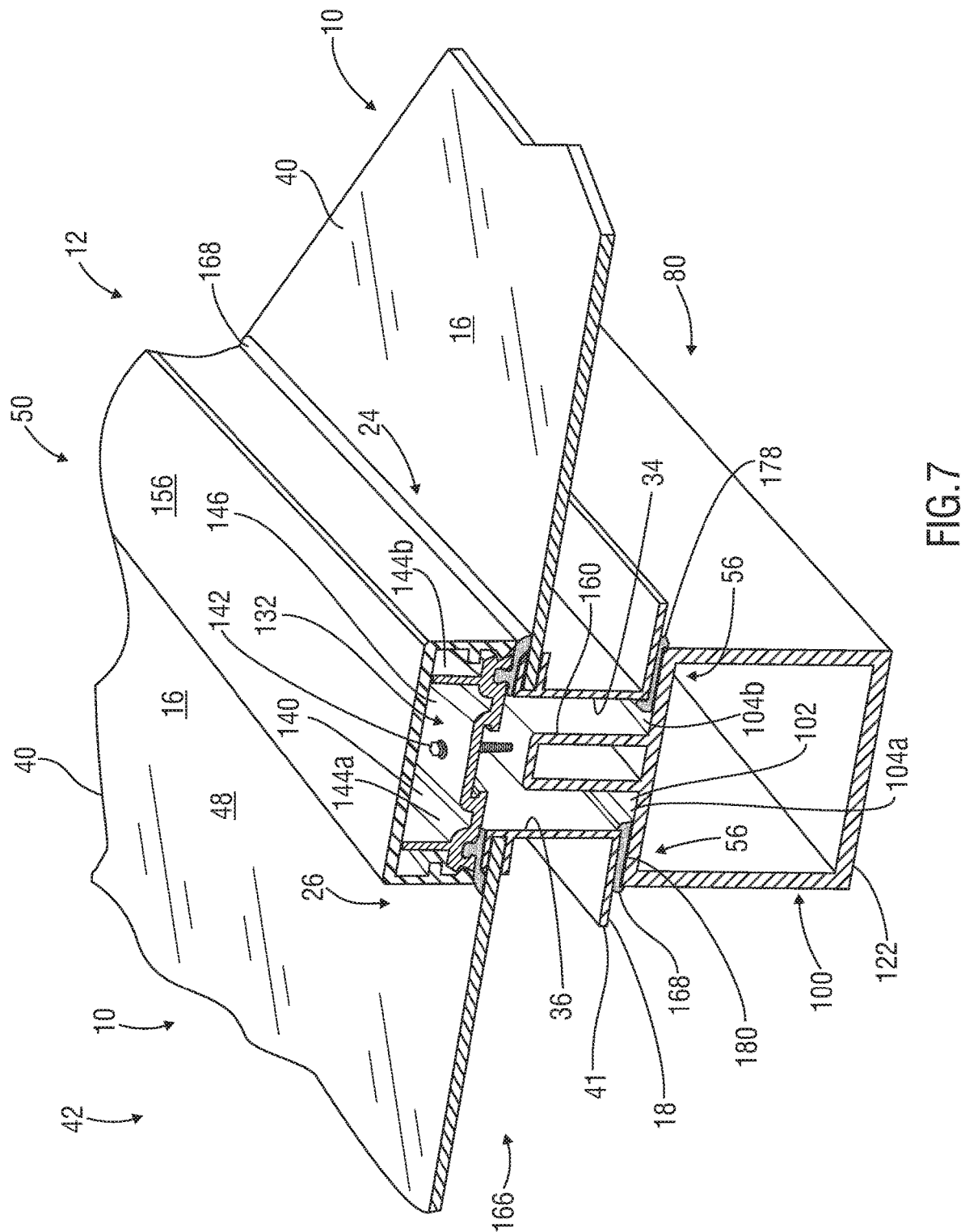
FIG. 7 is a cross-sectional view of part of an exemplary leakproof roof taken in the middle of the roof looking toward the ridge of the roof, showing the attachment of adjacent panels in the same row to a common vertical beam of an exemplary panel support framework in accordance with one or more embodiments of the present disclosure.
Figure 8:
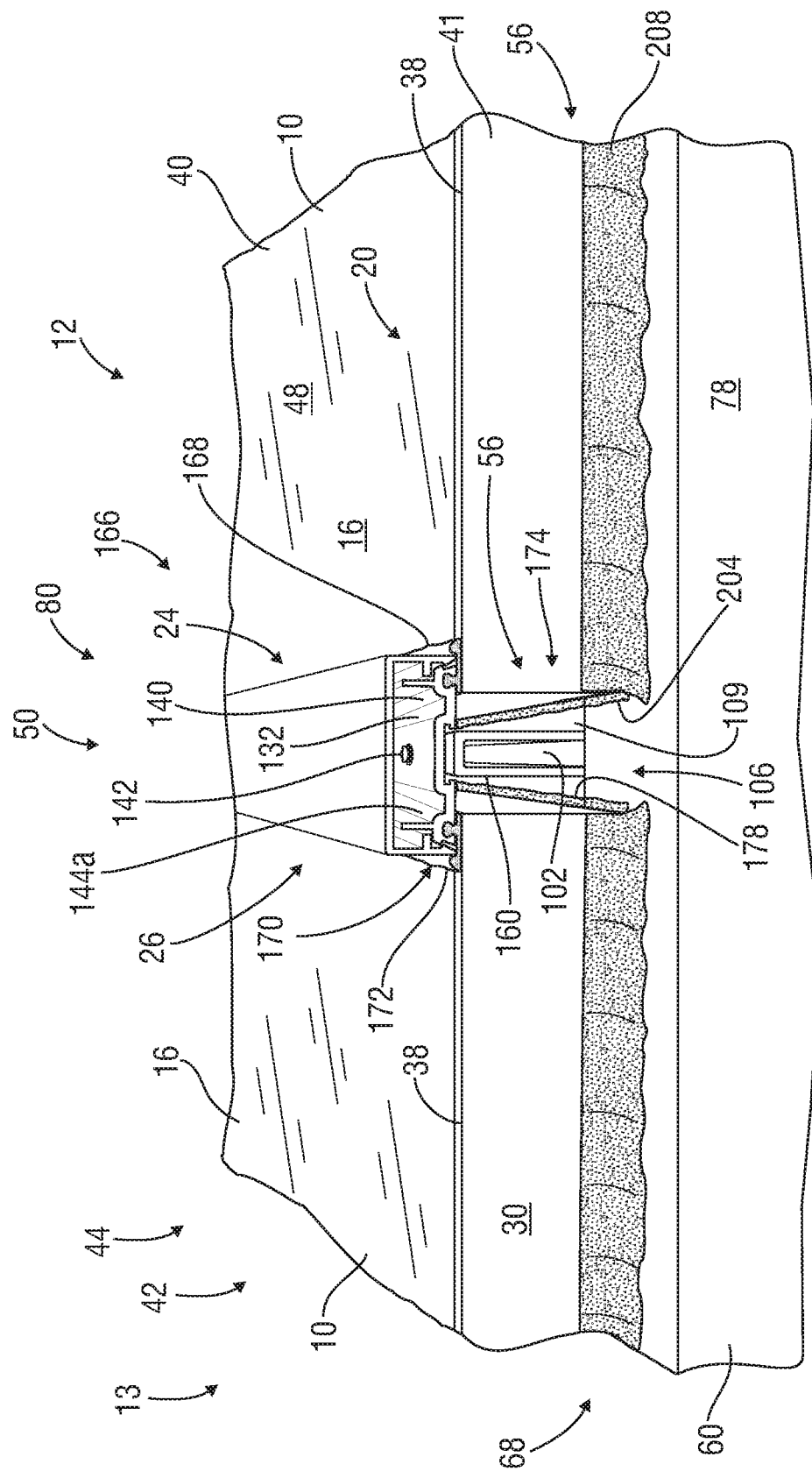
FIG. 8 is a perspective view of part of the lower end of the exemplary roof of FIG. 1 showing two adjacent rows of panels mounted in the exemplary panel mounting system.

Referring to FIGS. 6-8, at least some of the interfaces 56 (e.g., interfaces 174, 184, 202) may be sealed to form a substantially, or entirely, leakproof roof 12. For example, one or more liquid-tight seals 168 may be provided between the panels 10 and the panel mounting system 50 (e.g., the panel support framework 80) to prevent the leakage of liquid through the roof 12. References herein to preventing "leakage" and providing a "leakproof" roof generally refer to preventing liquid to leak through the roof between the panels 10 and/or components of the system 50, but does not include sealing any panel itself to prevent leakage through the panel 10. In the context of this patent, the terms "leakproof", "weatherproof", "sealed", "water resistant", "leak resistant" and "liquid resistant" are used synonymously to mean preventing the passage of liquid therethrough.

Depending upon the embodiment and application of the system 50, one or more of the aforementioned features may be provided to assist in allowing liquid to flow unimpeded down across the roof 12, providing liquid drainage paths that prevent or discourage liquid pooling upon the roof 12 or leakage through the roof, providing a substantially or completely leakproof roof 12, allowing unobstructed exposure of substantially the entire top face 16 of all or some of the panels 10 (e.g., to optimize the power-generating capacity of solar panels 40), or a combination thereof.

However, in some embodiments, the panel mounting system 50 may use different components or arrangements of parts (e.g., instead of or in addition to the panel support framework 80) to assist in supporting the panels 10, arranging at least some of the panels 10 in a stepped configuration, at least partially non-overlapping fashion or without (e.g., more than minimally) obstructing or covering the top face 16, front face 30 or transition 38 of one or more panels 10 or a combination thereof.

Referring now to FIGS. 1 & 4, when included, the panel support framework 80 may have any suitable form, components, configuration and operation. In many embodiments, the panel support framework 80 includes at least two horizontally-oriented support beams 84 (also referred to as horizontal beams) and at least two angularly-oriented support beams 100 (also referred to as vertical beams) configured to assist in supporting and positioning the panels 10 as desired to form the roof 12. However, the beams 84, 100 may be used for one or more different or additional purposes and the panel support framework 80 may include any different or additional configuration of support beams (e.g., diagonal beams) or other structures (e.g., flanges, sheets) to support the panels 10.

Referring to FIGS. 4-6, the horizontal beams 84, when included, may have any suitable or desired form, construction, shape, configuration, operation and location to assist in supporting the panels 10. In some embodiments, the horizontal beams 84 are hollow aluminum tubes having a rectangular cross-section, but could have any desired construction (e.g., wood, steel, PVC, plastic, titanium, etc.), configuration (e.g., solid, hollow or open) and cross-sectional shape (e.g., U-shaped, circular, oval, square, triangular). Each exemplary horizontal beam 84 includes top and bottom faces 91, 92 and front and rear faces 88, 90 and is positionable in the framework 80 to extend lengthwise over part of the underlying structure 60 at least partially between the left and right sides 72, 74 thereof. For example, the horizontal beams 84 may be spaced apart in succession at different heights across the area to be covered by panels 10. In this embodiment, three spaced-apart horizonal beams 84 are included, each extending across the entire width of the area to be covered by panels 10; in this instance essentially over the entire underlying structure 60. For example, a first horizontal beam 84a may be closest to the lower end 68 of the underlying structure 60, a third horizontal beam 84c closest to the upper end 64 of the underlying structure 60 and a second intermediate horizontal beam 84b situated therebetween. However, the framework 80 may include only one, or more than two (e.g., 3, 4, 5, 6, etc.), horizontal beam 84.

Furthermore, any other arrangement of horizontal beams 84 may be used. For example, multiple sections of horizontal beam 84 may be used the same height. In other words, the horizontal beam 84 at any level may not be a single integral beam, but include numerous components. For another example, any of the horizontal beams 84 may not extend across the entire width of the underlying structure 60, but extend to any desired lesser extent. For still a further example, the horizontal beams 84 at different levels may be interconnected (e.g., by weld) or formed as a single integral component (e.g., a grid). Thus, the terms "horizontal beam", "horizontally-oriented support beam" and variations thereof includes one or multiple components that extend lengthwise over any desired portion(s) of the underlying structure 60 at any desired height of the underlying structure.

Referring to FIGS. 4 & 7, the vertical beams 100, when included, may likewise have any suitable or desired form, construction, shape, configuration, operation and location to assist in supporting the panels 10. In some embodiments, the vertical beams 100 may be hollow aluminum tubes having a square cross-sectional shape, but could have any desired construction (e.g., wood, steel, PVC, plastic, titanium, etc.), configuration (e.g., solid, hollow or open) and cross-sectional shape (e.g., U-shaped (e.g., FIG. 2), circular, oval, square, triangular). Each exemplary vertical beam 100 include at least one top face 102 and front and rear ends 106, 108 and is positionable in the framework 80 to extend between a pair of adjacent horizontal beams 84 (or other structure(s)/components(s)) and thus be angularly-situated across part of the height of the underlying structure 60 between its upper and lower ends 64, 68 For example, at least two vertical beams 100 may be spaced apart from one another in succession between each respective adjacent pair of horizontal beams 84 across the area to be covered by the panels 10. In this embodiment, first (lower) and second (higher) rows 112, 114 of six spaced-apart vertical beams 100 (e.g., FIG. 1) are shown extending between the first and second horizontal beams 84a, 84b and second and third horizontal beams 84b, 84c, respectively, but any other desired configuration of fewer or more vertical beams 100 (e.g., 1, 2, 3, 4, 6, 7, etc.) on fewer or more rows 110 (e.g., 1, 3, 4, 6, etc.) may be provided.

However, any other arrangement of any desired number of vertical beams 100 may be used. For example, multiple sections of vertical beams 100 may be used at each location. In other words, the vertical beam 100 at any location may not be a single integral beam, but include numerous components. For another example, any of the vertical beams 100 may not extend across the entire span between adjacent horizontal beams 84, but extend to any desired lesser extent. For still a further example, the vertical beams 100 on the same row and/or on different rows may be interconnected, or formed as a single integral component. In fact, in some embodiments, multiple of the horizontal and vertical beams 84, 100 may be interconnected (e.g., by weld, mating connection, tab/slot connection, Lego connection) or formed of a single integral component (e.g., molded grid). Thus, the terms "vertical beam", "angularly-oriented support beam" and variations thereof includes one or multiple components that extend over any desired portion(s) of the underlying structure 60 at least partially between two or more horizontal beams 84 or other structures/components.

Referring now to FIG. 2, the horizontal and vertical beams 84, 100 can be used to assist in supporting and positioning the panels 10 to form the roof 12 in any suitable manner. For example, the horizontal and/or vertical beams 84, 100 may rest upon and/or be coupled to the underlying structure 60. In the present embodiment, each horizontal beam 84 rests upon and is coupled to the sub-frame 76 of the underlying structure 60. For example, the horizontal beams 84 may be coupled to the underlying structure 60 with couplers 94. The illustrated coupler 94 is a Z-shaped bracket 98 that is releasably connectable (e.g., by screw, nut, pin, etc.) to a horizontal beam 84 at one end and the sub-frame 76 at the other end. However, the couplers 94 may be used at any other desired locations and have any other form (e.g., clamp, clip, bolt), configuration, operations and construction. In some embodiments, the couplers 94 may be integral to the horizontal beams 84, underlying structure 60 or other component. Moreover, in various embodiments, couplers 94 may not be used. Thus, the inclusion and type of couplers 94 is not limiting upon the present disclosure, appended claims and claims of any patent claiming priority hereto, except and only to the extent as may be expressly specified otherwise, such as in a particular claim and only for such claim(s) and claim(s) depending therefrom. Further, in some embodiments, the horizontal beams 84 may not rest upon and/or be coupled to the underlying structure 60. In some embodiments, the vertical beams 100 (or other components) may rest upon and/or be coupled to the underlying structure 60, or both the horizontal and vertical beams 84, 100 may rest upon and/or be coupled to the underlying structure 60.

In order to carry or support the panels 10 in the panel mounting system 50, any suitable techniques and components may be used. For example, referring back to FIGS. 4 & 7, each horizontal and/or vertical beam 84, 100 may include one or more panel mounting surfaces 104 upon which one or more panel 10 may rest. In various embodiments, each vertical beam 100 includes at least one panel mounting surface 104 on its top face 102 for seating at least part of at least one panel 10. In the illustrated example, the panel mounting surface(s) 104a, 104b of the vertical beam 100 extends along substantially the entire length of the beam 100 and can seat the right side edge 26 of one panel 10 and the left side edge 24 of the adjacent panel 10, respectively, along (e.g., at least substantially) the entire length of the panels 10. In this particular configuration (e.g., FIGS. 1 & 6), the panels 10 of the first panel row 44 can be supported side-by-side on the first row 112 of vertical beams 100 and the panels 10 of the second panel row 46 can be supported side-by-side on the second row 114 of vertical beams 100, with the rear end 22 of each panel 10 on the first panel row 44 positioned proximate to the front end 20 of at least one panel 10 on the second panel row 46. As used throughout this patent, the terms "side-by-side" and variations thereof means the referenced items are generally oriented in the same way next to each other and can be abutting or spaced-apart, but not overlapping. The terms "abutting", "resting upon" and variations thereof mean and include one or more referenced item directly contacting one or more other referenced item, or having one or more seals (or other accessories) at least partially disposed, extending or sandwiched therebetween. Additional rows 42 of panels 10 could be similarly supported on additional rows 110 of vertical beams 100. However, any other suitable techniques and components may be used to carry or support the panels 10.

If desired, the adjacent horizontal and vertical beams 84, 100 may be coupled together. Referring specifically to FIG. 6, in the present embodiment, each vertical beam 100 is releasably connected at its respective front and rear ends 106, 108 to the adjacent horizontal beams 84, such as with a connector 116. Thus, each illustrated horizontal beam 84 positioned between rows 110 of vertical beams 100 (also referred to herein as an intermediate horizontal beam 84) essentially serves as a junction 86 for adjacent rows 110 vertical beams 100 (and thus adjacent rows 42 of panels 10). For example, the connector 116 may include a connecting block 118 (e.g., U-shaped, or L-shaped, angle iron or bracket) releasably coupled (e.g., by one or more mounting screw, bolt, etc.) between each pair of adjacent beams 84, 100. However, the connectors 116 may have any other desirable form (e.g., clamp, clip, bolt, mateable connection, tab/slot connection, Lego-type connection), configuration, operation and construction. In some embodiments, for example, the connectors 116 may be integral to the horizontal and/or vertical beams 84, 100. Moreover, in various embodiments, connectors 116 may not be used. Thus, the inclusion and type of connectors 116 is not limiting upon the present disclosure, appended claims and claims of any patent claiming priority hereto, except and only to the extent as may be expressly specified otherwise, such as in a particular claim and only for such claim(s) and claim(s) depending therefrom.

Referring again to FIGS. 1 & 6, if the panel mounting system 50 (e.g., the panel support framework 80) is used to assist in establishing a vertically-offset arrangement of the successive rows 42 of panels 10, any suitable techniques and components may be used. In some embodiments, the horizontal and/or vertical beams 84, 100 of various embodiments may be arranged to establish the vertically-offset arrangement. For example, one or more of the beams 84 and/or 100 that establish the height of each row 42 of panels 10 on the roof 12 can be arranged in a stepped fashion. In the present embodiment, since the panels 10 sit on the panel mounting surface(s) 104 of the vertical beams 100, the height of the panels 10 can be established by selectively positioning the vertical beams 100. In this example, each successive row 110 of vertical beams 100 is vertically offset relative to the adjacent vertical beam rows 110. For example, the second illustrated row 114 of vertical beams 100 is offset upwardly relative to the first illustrated row 112, thus offsetting the height of the respective panels 10 supported thereon.

When successive rows 110 of vertical beams 100 are vertically offset relative to one another, any suitable techniques and components may be used. In certain embodiments, the vertical beams 100 in each row 110 can extend in a different longitudinal plane 128 than the vertical beams 100 in the adjacent row(s) 110. In the illustrated example, the vertical beams 100 in the first row 112 are shown extending in (approximately, or at least substantially) the same "first" longitudinal plane 128a, while the vertical beams 100 in the second row 114 are shown extending in (approximately, or at least substantially) the same "second" longitudinal plane 128b, which is offset upwardly relative to the first longitudinal plane 128a. Consequently, the second (upper) exemplary panel row 46 will be offset upwardly relative to the first (lower) panel row 44. If desired, additional rows 110 of vertical beams 100, and thus panel rows 42, could be similarly positioned in a stepped fashion in succession above and/or below the first and second rows 112, 114 of vertical beams 100 (and panel rows 44, 46) across the desired area to be covered. It should be noted that, in some embodiments, all the vertical beams 100 in the same row 112 may not be in the same longitudinal plane 128 as long as each vertical beam 100 in a particular row 110 is offset upwardly relative to the adjacent vertical beam(s) 100 on the next lower row 110 and downwardly relative to the adjacent vertical beam(s) 100 on the next higher row 110. Thus, the present disclosure, appended claims and claims of any patent claiming priority hereto are not limited to vertical beams 100 on a common row 110 extending in exactly the same longitudinal plane 128, except and only to the extent as may be expressly specified otherwise, such as in a particular claim and only for such claim(s) and claim(s) depending therefrom When this feature is included, the vertical beams 100 on different respective rows 110 may be positioned in different longitudinal planes 128 in any suitable manner. Referring still to FIGS. 1 & 6, for example, the front end 106 of each vertical beam 100 in a higher row 110 may be positioned (e.g., secured) higher on, or relative to, the intermediate horizontal beam(s) 84 than the rear end 108 of vertical beam(s) 100 on the adjacent lower row 110. In such embodiments, the use of the intermediate horizontal beams 84 as junctions 86 for vertical beams 100 on separate rows 100 may aid in positioning panels 10 on adjacent rows 42 in a stepped fashion. In the present embodiment, at least the intermediate horizontal beam 84 is oriented in an upright position (e.g., to provide sufficient height) to accommodate coupling the front end 106 of each higher vertical beam 100 (e.g., of row 114) thereto at a height that is greater than the height that the rear end 108 of each lower vertical beam 100 (e.g., of row 112) is coupled thereto (and also may assist in providing the desired overall pitch of the roof 12). If additional rows 110 of vertical beams 100 are included, those vertical beams 100 could be coupled at their ends 106, 108 to the associated intermediate horizontal beams 84 in a similar manner.

If desired, the vertical beams 100 could be positioned relative, or coupled, to the associated horizontal beams 84 so that (i) the mounting surfaces 104 of each higher vertical beam 100 are essentially flush with the top face 91 of the horizontal beam 84 (e.g., to ensure each associated panel 10 will be flat in the framework 80), (ii) the bottom face (lip, corner or edge) 122 of each lower vertical beam 100 is essentially flush with the bottom face 92 of the horizontal beam 84, or (iii) both. However, any other suitable techniques and components may be used to vertically offset the different rows 110 of vertical beams 100 or otherwise vertically offset the different rows 42 of panels 10. For example, in some embodiments, the horizontal beams 84 may not be arranged in an upright orientation, one or more additional components may be included or used to establish the vertically-offset relationship of the panel rows 42, the vertical beams 100 may not be coupled to the horizontal beams 84 or a combination thereof.

Still referring to FIGS. 1 & 6, if the panel mounting system 50 (e.g., the panel support framework 80) is used to assist in positioning at least some of the panels 10 in a non-overlapping configuration, any suitable techniques and components may be used. For example, adjacent panels 10 on each respective row 42 and adjacent panels 10 on adjacent rows 42 (e.g., rows 44, 46) may be positioned side-by-side. In some embodiments, such as when intermediate horizontal beams 84 serve as junctions 86 for vertical beams 100 on adjacent vertical beam rows 110, the vertical beams 100 may be positioned relative to the associated horizontal beams 84 to selectively position the panels 10 supported thereby in a non-overlapping fashion. In other words, in such embodiments, the use of the intermediate horizontal beams 84 as junctions 86 for vertical beams 100 on separate rows 100 may aid in positioning panels 10 on adjacent rows 42 in a non-overlapping fashion.

For example, each vertical beam 100 on a lower row 110 (e.g., first row 112) may be situated so that the rear face 32 of each panel 10 carried thereon at least partially abuts, or covers, at least part of the front face 88 of the intermediate horizontal beam 84, and each adjacent vertical beam 100 on the next higher row 110 (e.g., second row 114) may be situated so that the front end 20 of the panel(s) 10 carried thereon rests at least partially upon the top face 91 of the horizontal beam 84 or the front face 30 of such panel(s) 10 abut, or cover, at least part of the rear face 90 of the horizontal beam 84. In such scenarios, as long as the vertical beams 100 on the higher row 110 (e.g., second row 114) do not extend beyond the front face 88 of the horizontal beam 84, the panels on those adjacent rows 110 (e.g., rows 112, 114) will not overlap, or cover, one another. For example, the front end 20 of each panel 10 on the higher row 110 (e.g., second row 114) can be selectively positioned on the top face 91 of the horizontal beam 84 anywhere along the width $W_2$ thereof, but not extending over the front face 88 of the beam 84 to prevent overlapping of the respective associated panels 10. In the present embodiment, the front edge 20 of each panel 10 carried on the higher row 110 (e.g., second row 114) is positioned on the top face 91, and spaced rearwardly of the front face 88, of the associated horizontal beam 84 and thus spaced away from, and not overlapping, the adjacent panel(s) 10 on the lower row 110 (e.g., first row 112). However, any other suitable technique(s) and components may be used to provide a non-overlapping arrangement of panels 10.

Referring now to FIGS. 6 & 7, in many embodiments, the panels 10 may be secured to, or carried by, the panel mounting system 50 in any suitable manner and with any desired components. Generally, at least some of the panels 10 are releasably secured to, or carried by, the exemplary system 50 at at least one interface 56 in order to retain and position the panels 10 as desired. In some embodiments, at least some of the panels 10 may be securely, releasably coupled to the panel support framework 80 without more than minimally obstructing or covering the top face 16 and/or transition 38 thereof. This may be beneficial to allow much or all of the top face 16 of the panels 10 (e.g., solar panels 40) to be substantially or entirely exposed, minimally block the flow of liquid down across the panels 10, for any other purpose(s) or a combination thereof. In some embodiments, the panels 10 may be secured to the framework 80 from underneath one or more of the panels 10 or between adjacent panels 10, thus minimally covering or obstructing the top face 16 and/or transition 38 of at least some of the panels 10. For example, panels 10 may be friction-fit to the framework 80, snapped or slid into panel receivers on the framework 80, coupled with mateable connectors, clips, brackets or other components at least partially below or beside one or more panels 10.

Referring to FIGS. 7 & 8, in various embodiments, one or more panels 10 may be secured to the framework 80 along at least part of one of the side edges 24, 26 thereof to cover or obstruct only a small portion, if any, of the top face 16 and/or transition 38 thereof. For example, the panels 10 may be secured to the framework 80 with the use of a plurality of releasable clamps 132. To securely, releasably couple the panels 10 to the panel support framework 80, the clamps 132, when included, may engage the panels 10 and/or panel support framework 80 in any suitable manner. For example, each clamp 132 may extend over at least one panel 10 along at least part of one of the side edges 24, 26 thereof and engage the panel support framework 80 to cover, or obstructs, only a small portion (if any) of the top face 16 and transition 38 of each panel 10. In the present embodiment, adjacent panels 10 in the same row 42 are secured to the framework 80 with a single (elongated) clamp 132 extending over their adjacent side edges 24, 26 along substantially the entire length Li (e.g., FIGS. 1 & 3) of the panels 10. The illustrated clamp 132 extends minimally over the top face 16 (e.g., frame 41 of panel 10) and transition 38 (e.g., FIG. 5) of each panel 10 it engages and clamps them to the framework 80. In other embodiments, the clamps 132 may engage the panels 10 at any other location, cover more of the top face and/or transition 38 of one or more panels 10 or be integral to the panel support framework 80, multiple clamps 132 may be used along the length Li of the panels 10, different type of clamps 132 may be used at different locations or a combination thereof.

When included, the clamps 132 may have any suitable form, configuration, construction and operation to secure the panels 10 to the framework 80 as desired. Referring to FIGS. 7 & 9, in the present embodiment, each clamp 132 includes at least one pressure plate 140 configured to secure at least one panel 10 to the framework 80. The pressure plate 140 may have any suitable form configuration and operation. For example, the pressure plate 140 may include at least one panel engagement arm 144 to engage at least one panel 10 and at least one beam engagement portion 146 to engage the panel support framework 80. In this embodiment, the clamps 132 each include a laterally-extending, left panel engagement arm 144a for engaging the right side edge 26 of a panel 10 on its left, and a laterally-extending, right panel engagement arm 144b for engaging the left side edge 24 of a panel 10 on its right. At least one beam engagement portion 146 is shown therebetween and releasably securable to the adjacent vertical beam 100 that the respective panels 10 rest upon. However, the clamps 132 may have different component parts or take any other form, such as clips, brackets, mateable portions, pins, ratchet mechanisms, etc. Accordingly, the nature of the clamps 132, if included, and any details thereof, are not limiting upon the present disclosure, appended claims and claims of any patent claiming priority hereto, except and only to the extent as may be expressly specified otherwise, such as in a particular claim and only for such claim(s) and claim(s) depending therefrom.

Still referring to FIGS. 7 & 9, the exemplary beam engagement portion 146 of the illustrated pressure plate 140 is releasably securable to the vertical beam 100, such as with connector(s) 142, and may be tightened down to secure the panels 10 to the framework 80 as desired. The illustrated connectors 142 are a series of screws (e.g., pressure screws) spaced apart as desired along the length of the pressure plate 140. However, the connector(s) 142 could take any other form, such as mateable members, clips, pin, spring-biasing members, and the like. In other embodiments, the panels 10 may be coupled to the horizontal beams 84 or other components, and/or connectors 142 may not be necessary or may be integral to the clamps 132 and/or support framework 80. Thus, the nature of the connectors 142 if included, and any details thereof, are not limiting upon the present disclosure, appended claims and claims of any patent claiming priority hereto, except and only to the extent as may be expressly specified otherwise, such as in a particular claim and only for such claim(s) and claim(s) depending therefrom. In this embodiment, as the clamp 132 is tightened down onto the vertical beam 100, compressive force is applied by the panel engagement arm(s) 144 upon each panel 10 engaged thereby to secure it in position. For example, the exemplary clamp 132 may apply the same, or a sufficiently similar, amount of pressure to each such panel 10, such as to keep the panels 10 and roof 12 properly aligned as desired, and/or for any other purpose(s). However, some embodiments may not require such level of (or any) clamping precision.

Still referring to FIGS. 7 & 9, the clamps 132 may be releasably coupled to any desired part of at least one vertical beam 100. In some embodiments, each pressure plate 140 is releasably coupled to one or more attachment tabs 160 protruding upwardly from the vertical beam 100. The attachment tab(s) 160, when included, may have any suitable form, configuration, operation and construction. In the present embodiment, an elongated attachment tab 160 extends upwardly from the vertical beam 100 between the left and right panel mounting surfaces 104a, 104b along substantially the entire length of the vertical beam 100. The exemplary attachment tab 160 is integral to the vertical beam 100 and has an approximate height $H_3$ that is less than the height $H_1$ of the panels 10. In other embodiments, however, one or multiple attachment tabs 160, if included, may extend up from the vertical beam 100 to a different height at any desired location and or be coupled thereto (e.g., by weld, bracket, bolt, pin, mateable engagement, etc.).

Figure 10:
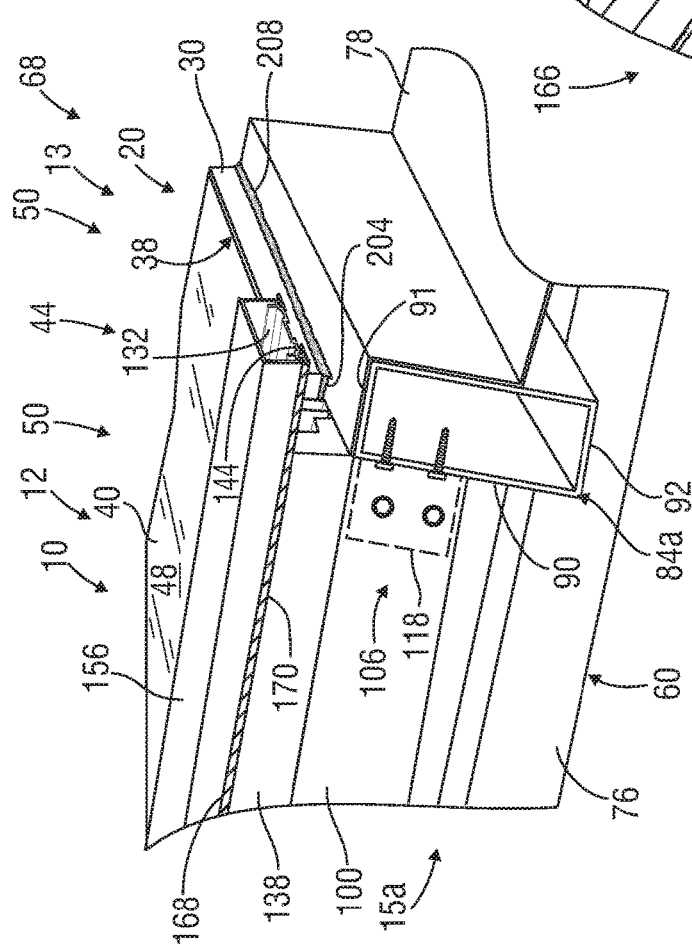
FIG. 10 is a perspective view of far left, lower corner of the exemplary roof of FIG. 1.

Referring specifically to FIGS. 9 & 10, for panels 10 on the far left and right sides 15a, 15b of the roof 12 (e.g., FIG. 1), the same version of exemplary clamp 132 can, in some embodiments, be used. If desired, a spacer 138 may be placed under the panel engagement arm 144 lacking a panel 10 beneath it, such as to fill the space between the pressure plate 140 and the vertical beam 100, assist in ensuring the proper pressure is transferred to the adjacent panel 10 or maintain pressure balance with the panel 10, for any other desired purpose(s) or a combination thereof. In the illustrated embodiment, the spacer 138 is an elongated hollow, L-shaped, extrusion, or beam, having a height $H_2$ that is the at least approximately equal to the height $H_1$ of the panel 10. However, the spacer 138, when included, may have any other suitable form, construction, configuration and operation. Thus, the nature of the spacer 138, and any details thereof, are not limiting upon the present disclosure, appended claims and claims of any patent claiming priority hereto, except and only to the extent as may be expressly specified otherwise, such as in a particular claim and only for such claim(s) and claim(s) depending therefrom. In other embodiments, a version of the clamp 132 not having both left and right panel engagement arms 144a, 144b, or any other components and techniques may be used to secure the panels 10 to the panel support framework 80 at the far left and right sides 15a, 15b of the roof 12.

Still referring to FIGS. 9 & 10, if desired, all, or part of, the clamp 132 may be covered, such as to help protect or preserve the clamp 132 and related components and/or prevent the entry of liquid thereupon, to assist in directing the flow of liquid across the roof 12 as desired, for aesthetic or any other purpose(s) or a combination thereof. In such instances, the clamp 132 may be covered in any suitable manner and with any suitable components. For example, each clamp 132 may be covered with one or more caps 156 having any suitable form, configuration, orientation and operation. In the present embodiment, the cap 156 is an elongated, partial-rectangular shaped cover 158 (e.g., an aluminum trim cap) that extends over the length of, and snaps into and out of engagement with, the pressure plate 140, hiding the clamp 132 from view and assist in giving the roof 12 a finished outer appearance. However, the cap 156 may have a different shape and/or construction, include multiple sections, engage the pressure plate 140 or other component(s) in a different manner (e.g., sliding engagement, pins, screws, etc.), or a combination thereof. Thus, the type, shape, configuration, construction, orientation and other details of the cap 156, if included, are in no way limiting upon the present disclosure, appended claims and claims of any patent claiming priority hereto, except and only to the extent as may be expressly specified otherwise, such as in a particular claim and only for such claim(s) and claim(s) depending therefrom.

Referring again to FIGS. 5-7, in another aspect of the present disclosure, if desired, the panel mounting system 50 may include a weather resistant barrier system 166, such as to assist in preventing the leakage of liquid through the roof 12, form a substantially, or entirely, leakproof roof 12 and/or for any other desired purpose(s). The weather resistant barrier system 166 may help make the roof 12 substantially or entirely leakproof in any suitable manner and with any desired components. For example, the weather resistant barrier system 166 may provide seals 168 at, or proximate to, one or more interfaces 56 between at least some of the panels 10 and the system 50 to prevent the leakage of liquid through the roof 12, form a substantially, or entirely, leakproof roof 12 and/or for any other desired purpose(s). In the present embodiment, at least two seals 168 are provided at, or proximate to, each interface 56, such as to ensure little or no leakage through the roof 12. However, in various other embodiment that include seals 168, only one, or more than two, seals 168 may be provided at one or more interfaces 56.

Referring now to FIGS. 8 & 9, in some embodiments, the weather resistant barrier system 166 may provide at least one seal 168 at, or proximate to, a first interface 174 where a panel 10 abuts, engages, or is otherwise proximate to one or more vertical beams 100. For example, at least a first seal 170 may be provided between each clamp 132 and each panel 10 it engages, such as to help prevent liquid leakage therebetween. When included, the first seal 170 may have any suitable form, configuration, orientation and operation. In the present embodiment, the first seal 170 includes at least one elongated rubber seal 172 (e.g., custom-cut neoprene gasket) extending along at least part of the length of the pressure plate 140 between one of the engagement arms 144a, 144b of the clamp 132 and the top face 16 of the associated panel 10 along one of the side edges 24, 26 thereof. In certain scenarios, it may be desirable to configure the first seal 170 to minimize the extent to which it extends across the top face 16 of the panel 10. For example, when the panel 10 is a solar panel 40, it may be preferred to limit the extent, if any, the seal 170 extends over the photovoltaic portion 48 thereof.

Each illustrated elongated rubber seal 172 includes an elongated protrusion 175 insertable or pressed into, or engageable with, an elongated groove 152 in the pressure plate 140 and a hollow portion 176 (e.g., FIG. 11) that is collapsible under pressure against the associated panel 10 to sealingly engage the panel 10. In the present embodiment, a separate elongated rubber seal 172 extends along the length of each respective engagement arm 144a, 144b of each clamp 132. However, the present disclosure and appended claims are not limited to that specific type of seal 172. As the exemplary clamp 132 is tightened down, each associated first seal 170 is compressed between the clamp 130 and associated panel 10 to form a seal with the panel 10. On the far left and right sides 15a, 15b of the illustrated roof 12, one of the seals 170 is shown engaging the spacer 138 (when included), but such sealing at that location is not necessary in this particular embodiment.

However, the first seal 170 may have any other form, configuration, construction and operation and be arranged in any other suitable manner. For example, the first seal 170 may not include any elongated protrusions 175 and/or a hollow portion 176, may not extend along the length of the clamp 132 or panel 19, may include liquid or semi-liquid (e.g., silicone caulk) sealant or other weatherproofing, foam tape, rubber door seals, multiple components, may be applied to the panel 10, both the panel 10 and clamp 132 or other components, or a combination thereof. Thus, the type, shape, configuration, construction, orientation and other details of the first seal 170 are in no way limiting upon the present disclosure, appended claims and claims of any patent claiming priority hereto, except and only to the extent as may be expressly specified otherwise, such as in a particular claim and only for such claim(s) and claim(s) depending therefrom.

Referring to FIGS. 7-9, instead of, or in addition to, the first seal 170, the weather resistant barrier system 166 may provide a second seal 178 at, or proximate to, the interface 174. The second seal 178 may have any suitable form, configuration, orientation and operation. In many embodiments, the second seal 178 is disposed between each panel 10 and each vertical beam 100 it rests upon. For example, the second seal 178 may be sandwiched between the bottom face 18 of the panel 10 and the top face 102 (e.g., the panel mounting surface 104) of the associated vertical beam 100. In the present embodiment, each second seal 178 includes one or more seal strips 180 extending along the length of one of the panel mounting surfaces 104. If desired, for example, the seal strip 180 may be formed of one or more beds of hardened liquid, or semi-liquid, sealant (e.g., silicone caulk or other weatherproofing) applied to the subject surface(s) of the panel 10 and/or the associated vertical beam 100. For example, the panel 10 may be effectively embedded in the seal strip 180. In some applications, a continuous (e.g., approximately ½" wide), bead of sealant may be laid down (e.g., from a tube) across the bottom face 18 of the panel 10 along its respective left or right side edge 24, 26 before laying the panel 10 onto the vertical beam 100 and which will, upon compressing them together, spread out (e.g., to approximately ¾") to harden and form the bed of sealant (seal strip 180) that substantially, or entirely, covers the underside of that portion of the panel 10 resting upon the vertical beam 100.

However, the second seal 178, when included, may have any other suitable form, configuration, construction, orientation and operation and be arranged in any suitable manner. For example, the second seal 178 may include one or more sections, or strips, of double-stick foam tape, rubber gasket seals, rubber door seals and/or a combination of multiple different types of seals. For another example, the second seal 178 may also, or instead, be sandwiched or extend between the panel 10 and a side of the associated attachment tab 160 or other surface of the vertical beam 100 or other component. Thus, the type, shape, configuration, construction, orientation and other details of the second seal 178 are in no way limiting upon the present disclosure, appended claims and claims of any patent claiming priority hereto, except and only to the extent as may be expressly specified otherwise, such as in a particular claim and only for such claim(s) and claim(s) depending therefrom.

In embodiments including multiple seals 168 (e.g., both first and second seals 170, 178) at the first interface 174 (between a panel 10 and vertical beam 100), the second seal (e.g., seal 178) can serve as a backup to the first seal (e.g., seal 170). For example, if liquid penetrates through the first seal 170, the second seal 178 can prevent liquid entry to the first interface 174 and through the roof 12. Thus, this is an example of two layers of sealing protection at each interface 174 between a panel 10 and a vertical beam 100.

Referring specifically to FIG. 8, in various embodiments, if there only a second seal 178 at the first interface 174, or liquid penetrates the first seal 170 or clamp 132 (e.g., at connectors 142), the liquid can drain through one or more continuous weep channels 109 of the corresponding vertical member 100 and down across the exterior of the roof 12 (e.g., along flow path 83, FIG. 5). In this embodiment, the weep channel 109 is the (non-perforated) top face 102 of the vertical beam 100, but could have any other form and configuration. In instances including one or more weep channels 109 or other flow paths on the outside of the roof 12 proximate to the first interface 174, the second seal 178 may sufficiently leakproof the first interface 174.

Figure 12:
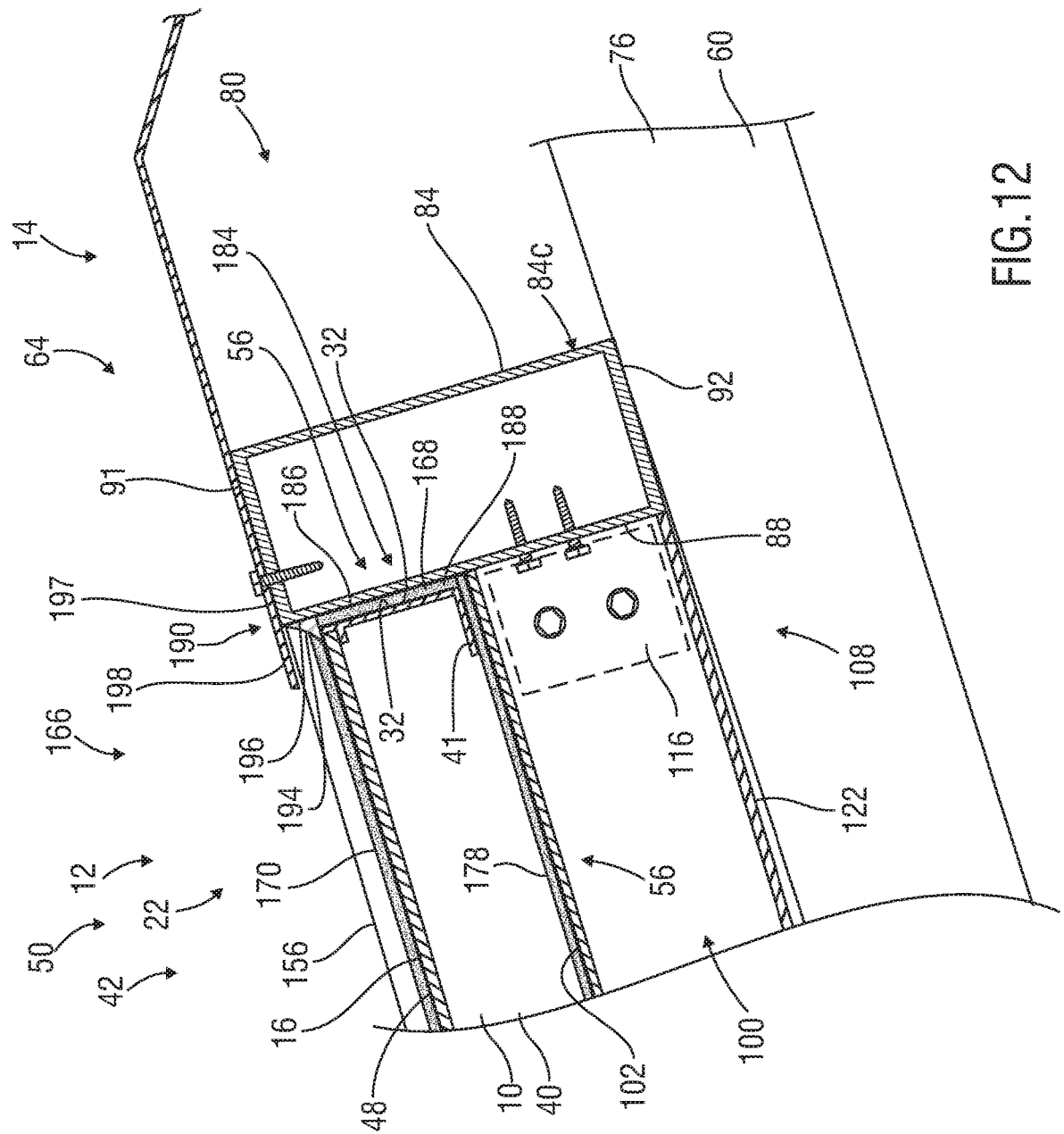
FIG. 12 is a cross-sectional view of part of a leakproof roof taken at the ridge of the roof looking to the left and assembled using an exemplary panel mounting system and method in accordance with one or more embodiments of the present disclosure.

Referring now to FIG. 12, in many embodiments, the weather resistant barrier system 166 may provide at least one seal 168 at, or proximate to, a second interface 184, where the rear end 22 of a panel 10 abuts, engages, or is otherwise proximate to one or more horizontal beams 84. For example, in some embodiments, at least a third seal 186 may be provided between the rear face 32 of each such panel 10 and the front face 88 of the horizontal beam 84 it abuts, such as to help prevent the leakage of liquid therebetween. The third seal 186 may have any suitable form, configuration, orientation and operation. For example, the third seal 186 may include one or more seal strips 188 extending at least partially along the rear face 32 (e.g., the width W₁, FIG. 3) of the subject panel 10. In the present embodiment, the seal strip 188 includes one or more sections, or strips, of double-stick foam, other sealing, tape applied to substantially the entire rear face 32 of the panel 10, or the corresponding portion(s) of the front face 88 of the horizontal beam 84, and which will be sandwiched and compressed therebetween upon securing the panel 10 to the panel support framework 80. In some instances, the sealing tape may be able to give, or flex, during assembly of the roof 12, allowing the corresponding panel 10 to shift as it is being secured the framework 80 without jeopardizing a liquid-tight seal at the second interface 184.

However, the third seal 186, when included, may have any other suitable form, configuration, construction, orientation and operation and be arranged in any suitable manner. For example, the seal strip(s) 188 may include one or more sections, or strips, of rubber gasket seals, rubber door seals, one or more beds of hardened liquid, or semi-liquid, sealant (e.g., silicone caulk or other weatherproofing) applied to the subject surface(s) of the panel 10 and/or the associated horizontal beam 84 or a combination of multiple different types of seals. For another example, the third seal 186 may also, or instead, be sandwiched or extend between the panel 10 and a different surface of the corresponding horizontal beam 84 or other component(s). Thus, the type, shape, configuration, construction, orientation and other details of the third seal 186 are in no way limiting upon the present disclosure, appended claims and claims of any patent claiming priority hereto, except and only to the extent as may be expressly specified otherwise, such as in a particular claim and only for such claim(s) and claim(s) depending therefrom.

Still referring to FIG. 12, in some embodiments, the second interface 184 may include one or more seams 190 formed between the rear end 22 of a panel 10 and one or more horizontal beams 84. In such instances, the weather resistant barrier system 166 may provide at least one seal 168 along or proximate to one or more seams 190, such as to help prevent the leakage of liquid therethrough. For example, the weather resistant barrier system 166 may provide at least a fourth and/or fifth seal 194, 197 at, along or proximate to each seam 190.

The fourth seal 194 may have any suitable form, configuration, orientation and operation. For example, the fourth seal 194 may include at least one cap bead seal 196 laid down atop a seam 190 along its's length. If desired, the cap bead seal 196 may be formed of a bead of hardened liquid, or semi-liquid, sealant (e.g., silicone caulk or other weatherproofing) applied over the seam 190. In some applications, for example, a continuous, approximately ½" wide, bead of the sealant may be laid down across each seam 190 and secured thereto, spread, smoothed and/or shaped as desired (e.g., with an instrument or installer's finger) to form a desired (e.g., concave) slope or other path 82 (see e.g., path 82, FIG. 5) for liquid to flow over the panels 10, ensure the fourth seal 194 covers and seals the entire seam 190, for any other purpose(s) or a combination thereof.

However, the fourth seal 194, when included, may have any other suitable form, configuration, construction, orientation and operation and arranged in any suitable manner. For example, the fourth seal 194 may include one or more sections, or strips, of foam tape, rubber gasket seals, rubber door seals and/or a combination of multiple different types of seals. Thus, the type, shape, configuration, construction, orientation and other details of the fourth seal 194 are in no way limiting upon the present disclosure, appended claims and claims of any patent claiming priority hereto, except and only to the extent as may be expressly specified otherwise, such as in a particular claim and only for such claim(s) and claim(s) depending therefrom.

Referring still to FIG. 12, when included, the fifth seal 197 may have any suitable form, configuration, orientation and operation. For example, the fifth seal 197 may include at least one section, or strip, of flashing 198 extending over one or more seams 190 to help direct liquid away from, and prevent the passage of liquid, into the seam(s) 190, for any other purpose(s) or a combination thereof. In many embodiments, the flashing 198 may include any desired commercially available or custom-manufactured roof, or other, flashing or other suitable (e.g., impervious) material. In this instance, one or more strips of flashing 198 are secured to the horizontal beam(s) 84 to extend outwardly over the top face 16 of each adjacent panel 10 on the next lower panel row 42 sufficient to cover and direct liquid away from the seam(s) 190.

Still referring to FIG. 12, in some applications, such as when the panel 10 is a solar panel 40, it may be desirable to extend the flashing 198 only a minimal effective distance over the top face 16 of the panel 10, such as to minimize blocking or covering the top face 16 (e.g., such as the photovoltaic portion(s) 48). In the present embodiment (e.g., FIG. 6), one or more strips of flashing 198 may be sandwiched between the top face 91 of the horizontal beam 84 and a sixth seal 204 (e.g., as described below), or the bottom face 18 of the adjacent higher panel 10, and extend beyond the front face 88 of the horizontal beam 84 and over the lower panel 10 by approximately ½-¾ inches. On a particular row 42 of panels 10, the flashing 198 or other fifth seal 197 may, for example, also extend over the clamps 132 (and cap 156, if included) between adjacent panels 10, in which case a single strip of flashing 198 can be used for an entire row of panels 10 and clamps 132, if desired.

However, the fifth seal 197, when included, may have any other suitable form, configuration, construction, orientation and operation and arranged in any suitable manner. For example, the fifth seal 197 may include one or more sections, or strips, of rubber gasket seals, rubber door seals and/or a combination of multiple different types of seals. Thus, the type, shape, configuration, construction, orientation and other details of the fifth seal 197 are in no way limiting upon the present disclosure, appended claims and claims of any patent claiming priority hereto, except and only to the extent as may be expressly specified otherwise, such as in a particular claim and only for such claim(s) and claim(s) depending therefrom.

In many embodiments, the use of any combination of multiple seals 168 (e.g., third, fourth and fifth seals 186, 194, 197) at the second interface 184 can provide multiple layers of sealing protection where the rear end 22 of a panel 10 abuts, engages, or is otherwise proximate to one or more horizontal beams 84. For example, in the absence or failure of a fourth and/or fifth seal 194, 197, the third seal 186 may alone seal the second interface 184. The use of all three seals 186, 194, 197 is an example of three layers of sealing protection at the interface 184.

Referring back to FIG. 6, in many embodiments, the weather resistant barrier system 166 may provide at least one seal 168 at, or proximate to, a third interface 202, where the front end 20 of a panel 10 abuts, engages, rests upon or is otherwise proximate to one or more horizontal beams 84. For example, at least a sixth seal 204 may be provided between the front end 20 of each such panel 10 and the horizontal beam 84 to help prevent the leakage of liquid therebetween, including liquid draining through any weep channel(s) 109 of the adjacent vertical member 100 on the next higher panel row 42, and/or for any other desired purpose(s).

The sixth seal 204 may have any suitable form, configuration, orientation and operation. For example, the sixth seal 204 may include one or more seal strips 205 extending at least partially along the front end 20 (e.g., width $W_1$, FIG. 3) of the subject panel 10. If desired, for example, the seal strip 180 may be formed of one or more beds of hardened liquid, or semi-liquid, sealant (e.g., silicone caulk or other weatherproofing) applied to the subject surface(s) of panel 10 and/or the associated horizontal beam 84. In the present embodiment, the sixth seal 204 is disposed between the panel 10 and each horizontal beam 84 it rests upon. For example, one or more seal strips 205 may extend along the width $W_1$ of the panel 10 and be sandwiched between the bottom face 18 thereof and the top face 91 of the associated horizontal beam(s) 84. If desired, for example, the seal strip 205 may be formed of one or more beds of hardened liquid, or semi-liquid, sealant (e.g., silicone caulk or other weatherproofing) applied to the subject surface(s) of the panel 10 and/or the associated horizontal beam 84. For example, the panel 10 may be effectively embedded in the seal strip 205. In some applications, a continuous (e.g., approximately ½" wide), bead of sealant may be laid down (e.g., from a tube) across the bottom face 18 of the panel 10 along its front end 20 before laying the panel 10 onto the horizontal beam 84 and which will, upon compressing them together, spread out (e.g., to approximately ¾") to harden and form the bed of sealant (seal strip 205) that substantially, or entirely, covers the underside of that portion of the panel 10 resting upon the horizontal beam 84.

However, the sixth seal 204, when included, may have any other suitable form, configuration, construction, orientation and operation and arranged in any suitable manner. In some embodiments, the sixth seal 204 may include one or more sections, or strips, of double-stick foam tape, rubber gasket seals, rubber door seals and/or multiple different seals. For example, a sixth seal 204 may also, or instead, be sandwiched or extend between the panel 10 and a different surface of the horizontal beam 84 or other components. In various embodiments, the front end 20 of the panel 10 may not rest upon the horizontal beam 84, but instead abut the rear face 90 thereof. In such instances, the sixth seal 204 may instead be sandwiched between the front face 30 of the panel 10 and the rear face 90 of the horizontal beam 84. If desired, such sixth seal 204 may have the same form and configuration as the exemplary third seal 186 as described above or any other suitable form and configuration. Thus, the type, shape, configuration, construction, orientation and other details of the sixth seal 204 are in no way limiting upon the present disclosure and appended claims, except and only to the extent as may be expressly specified otherwise herein or in a particular claim hereof and only for such instances, claim(s) and claim(s) depending therefrom.

Still referring FIG. 6, the third interface 202 may include one or more seams 206 formed between the front end 20 of a panel 10 and one or more horizontal beams 84. In the present embodiment, a seam 206 extend between the front face 30 of the panel 10 and the top face 91 of the horizontal beam 84. However, in other embodiments, the seam(s) 206 may extend against other surfaces, such has between the top face 16 of the panel 10 and rear face 90 of the horizontal beam 84. The weather resistant barrier system 166 may provide at least one seal 168 along or proximate to each seam 206, such as to help prevent the leakage of liquid therethrough. For example, the weather resistant barrier system 166 may provide at least a seventh seal 208 at, along or proximate to each seam 206. The seventh seal 208 may have any suitable form, configuration, orientation and operation. In some embodiments, the seventh seal 208 may include at least one cap bead seal 210 laid down atop each seam 206 along its's length. If desired, the cap bead seal 210 may be formed of a bead of hardened liquid, or semi-liquid, sealant (e.g., silicone caulk or other weatherproofing) applied over the seam 206. In the present application, for example, a continuous, approximately ½" wide bead of sealant may be laid down across the seam 206 and secured thereto, spread, smoothed and/or shaped as desired (e.g., with an instrument or installer's finger), to form a (e.g., concave) slope or other path for liquid to drain and flow over the panels 10, ensure the seventh seal 208 covers and seals the entire seam 206, for any other purpose(s) or a combination thereof.

However, the seventh seal 208, when included, may have any other suitable form, configuration, construction, orientation and operation and arranged in any suitable manner.

For example, the seventh seal 208 may include one or more sections, or strips, of foam tape, rubber gasket seals, rubber door seals and/or a combination of multiple different types of seals. Thus, the type, shape, configuration, construction, orientation and other details of the seventh seal 208 are in no way limiting upon the present disclosure and appended claims, except and only to the extent as may be expressly specified otherwise herein or in a particular claim hereof and only for such instances, claim(s) and claim(s) depending therefrom.

In embodiments including multiple seals 168 (e.g., both sixth and seventh seals 204, 208) at the third interface 202, one seal 168 (e.g., the sixth seal 204) can serve as a backup to the other seal (e.g., seventh seal 208). For example, if liquid penetrates through the seventh seal 208, the sixth seal 204 can prevent water entry to the third interface 202 and through the roof 12. Thus, this is an example of two layers of sealing protection at each interface 202 between a panel 10 and horizontal beam 100.

Referring still to FIG. 6, in many embodiments, the weather resistant barrier system 166 may provide at least one seal 168 at, or proximate to, any intersection 212 of horizontal and vertical members 84, 100. For example, a strip, bed or bead of sealant or calking (e.g., such as described above with respect to seals 178, 186, 196, 204, 208) could be applied at, around or proximate to one or more intersections 212, sandwiched between the horizontal and vertical members 84, 100 or a combination thereof, to assist in preventing liquid leakage (e.g., liquid draining through the weep channel(s) 109 of the vertical member 100) therebetween and through the roof 12.

Still referring FIG. 6, in some embodiments having one or more caps 156 used to cover one or more clamps 132, the weather resistant barrier system 166 may provide one or more seals 168 around or adjacent to the caps 156. For example, if one or more seams 214 (e.g., FIG. 5) are formed between the cap 156 and one or more horizontal beams 84, the weather resistant barrier system 166 may provide at least an eighth seal 218 at, along or proximate to each such seam 214, such as to help prevent the leakage of liquid therethrough. The eighth seal 218 may have any suitable form, configuration, orientation and operation. For example, the eighth seal 218 may include at least one cap bead seal (similar to cap bead seals 196, 210) laid down atop each seam 214 along the seam's length. If desired, the cap bead seal may be formed of a bead of hardened liquid, or semi-liquid, sealant (e.g., silicone caulk or other weatherproofing) applied over each seam 214. In the present application, for example, a continuous, approximately ½" wide bead of sealant may be laid down across each seam 214 and secured thereto, spread, smoothed and/or shaped as desired (e.g., with an instrument or installer's finger) to form a (e.g., concave) slope or other path for liquid to drain and flow over the panels 10, ensure the eight seal 216 covers and seals the entire seam 214, for any other purpose(s) or a combination thereof.

However, the eighth seal 216, may not be necessary in many embodiments, and when included, may have any other suitable form, configuration, construction, orientation and operation and arranged in any suitable manner. For example, the eighth seal 216 may include one or more sections, or strips, of foam tape, rubber gasket seals, rubber door seals and/or a combination of multiple different types of seals. Thus, the type, shape, configuration, construction, orientation and other details of the eighth seal 216 are in no way limiting upon the present disclosure and appended claims, except and only to the extent as may be expressly specified otherwise herein or in a particular claim hereof and only for such instances, claim(s) and claim(s) depending therefrom.

Referring to FIGS. 8 & 10, in some embodiments, the trim 78 or other component(s) at the lower end 13 of the roof 12, may be formed over or around the first horizontal beam 84. In such instances, the front end 20 of the panels 10 at that location (e.g., on the first row 44) and any related seals 168 (e.g., the sixth and seventh seals 204, 208) may at least partially rest upon the trim 78 (or other component). If desired, the (e.g., edge) trim 78 may be custom formed, such as to fit the framework 80, provide a finished look to the system 50 and e shed liquid down off the roof 12 as desired, for any other purposes(s) or a combination thereof.

Figure 13:
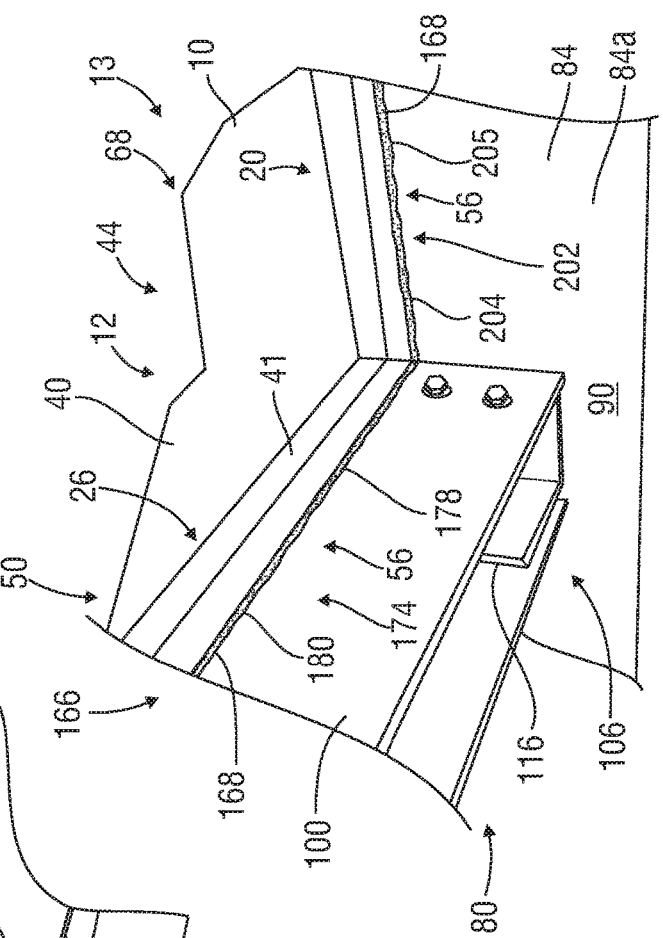
FIG. 13 is a perspective view of part of the underside the exemplary roof shown in FIG. 1 at the lower end thereof.

In various embodiments, any of the seals 168 (e.g., seals 170, 178, 186, 194, 197, 204, 208, 216) may extend (e.g., protrude or splurge) out beyond the respective corresponding surfaces or interface 56 as a natural consequence of forming the seal 168, due to the nature of the sealing material, to ensure a liquid-tight seal across the entire area to be sealed, to aid in directing the flow of liquid drainage, for any other purpose(s) or a combination thereof. For example, in FIGS. 7-9, the second seal 178 is shown (as viewed from above) extending beyond the associated intersection of at least some of the panels 10 and associated vertical members 100 (e.g., at the first interface 174), and in FIGS. 2 & 13 as viewed from below. For another example, in FIGS. 5, 8 and 10, the sixth seal 204 is shown (as viewed from above) extending beyond the associated intersection of at least some of the panels 10 and associated horizontal member 84 (e.g., at the third interface 202), and in FIGS. 2 & 13 as viewed from below.

However, when included, the seals 168 may have any other desired form, configuration, arrangement, construction, location and operation. Moreover, the weather resistant barrier system 166, when included, may have any other desired form, components, configuration and operation and the interfaces 56 (e.g., interfaces 174, 184 and 202) and/or other locations on the roof 12 may be sealed in any other suitable manner and with any other suitable components.

The panel mounting system 50 and roof 12 may be assembled and/or made leakproof in any suitable manner and any desired order. In some embodiments, referring to FIGS. 1-13, methods of mounting at least two rows 42 of panels 10 onto an underlying structure 60 to form at least part of a pitched roof, wall or other structure 12 include mounting a panel support framework 80 onto the underlying structure 60. The first (e.g., lowermost) exemplary panel row 44 may be mounted to the panel support framework 80 closest to the lower end 68 of the underlying structure 60 and extending angularly upwardly therefrom over part of the panel support framework 80. The second (e.g., next higher) panel row 46 may be secured to the exemplary panel support framework 80 between the first panel row 44 and the upper end 64 of the underlying structure 60 and extending angularly upwardly therefrom over part of the panel support framework 80. The panels 10 may be arranged so that each panel 10 on the second row 46 is offset upwardly relative to adjacent panel(s) 10 on the first row 44 in a stepped fashion and/or so that the panels 10 do not overlap one another. Additional rows 42 of panels 10 may be similarly mounted, each successive row 42 secured to the framework 80 between the highest panel row 42 and the upper end 64 of the underlying structure. However, in other embodiments, the panels rows 42 may be laid in the reverse, or any other, order.

Still referring to FIGS. 1-13, any one or more of the following features may be included in certain embodiments of assembling the panel mounting system 50 and roof 12 depending upon the application, personal preference, other variable(s) or a combination thereof. Thus, some embodiments may include all, only some or none of these features. The panel mounting system 50 and roof 12 may be assembled to allow the unimpeded shedding, or flow, of liquid down across the roof 12 (e.g., arrows 82, FIG. 5), including, for example, from the top face 16 of the panel(s) 10 of a higher (e.g., the second) panel row 46, over the front edge 20 thereof (e.g., down a vertical and/or angled drop) and onto the top face 15 of one or more panel(s) 10 of the next lower (e.g., the first) panel row 44. At least some (e.g., all) of the interfaces 56 between one or more panels 10 and the framework 80 may be sealed, such as to form a leakproof roof 12. Seals 168 may be provided, for example, between the panels 10 and panel support framework 80 to prevent the leakage of liquid down through the roof 12. For example, at least one seal 168 may be provided at, or proximate to, one or more (e.g., each) interfaces 56. One or more intersections of components of the panel support framework 80 may also, or instead, be sealed.

In some embodiments, the panels 10 may be secured to the panel support framework 80 without more than minimally obstructing or covering the top face 16 and/or transition 38 of each panel 10. When at least some of the panels 10 are solar panels 40, for example, the panels 10 may be secured to the panel support framework 80 so that none of the panels 10 covers or overlaps more than a minimal amount of the photovoltaic portion(s) 48 of any of the solar panels 40.

The panels 10 may be securely, releasably, clamped to the panel support framework 80. For example, the panels 10 may be secured to the framework 80 with a plurality of clamps 132 without more than minimally obstructing or covering the top face 16 and/or transition 30 of each panel 10 (or certain panels 10). In some embodiments, at least one elongated clamp 132 extends over at least one panel 10 along at least part of one of the side edges 24, 26 thereof and engaged with the panel support framework 80. At least one seal 168 may be provided between each clamp 132 and each panel 10 it secures to the framework 80.

For the panel support framework 80, at least first and second rows 110 of vertical beams 100 each extending at least partially between the upper and lower ends 64, 68 of the underlying structure 60, and at least one horizontal beam 84 extending at least partially between the left and right sides 72, 74 of the underlying structure 60 and between the first and second rows 110 of vertical beams 100 may be provided. If desired, the horizontal beam(s) 84 may rest upon and/or engage the underlying structure 60. Vertical beams 100 on the second row 110 may be at least substantially linearly aligned and offset upwardly relative to vertical beams 100 on the first row 110.

If each panel row 42 includes multiple panels 10, for example, the panels 10 of each respective row 42 may be positioned side-by-side. Each pair of adjacent panels 10 on a common row 42 may be positioned resting the right side edge 26 of the panel on the left and the left side edge 24 of the panel on the right of atop a common vertical beam 100. For each pair adjacent rows 42 of panels 10, the rear face 32 of each panel 10 on the lower row 42 (e.g., first row 44) may be positioned so that its rear face 32 abuts the front face 88 of at least one horizontal beam 84. The front edge 20 of each panel 10 on the next higher panel row 42 (e.g., second row 46) may be placed atop at least a portion of at least one horizontal beam 84 and spaced rearwardly of the front face 88 thereof, so that the panels 10 on the higher row 42 are vertically higher than, and spaced rearwardly of, the panels 10 on the lower row 42. Additional rows 42 of panels could be similarly arranged. If desired, at least one elongated clamp 132 may be positioned over at least part of the adjacent side edges 24, 26 of each pair of adjacent panels 10 and secured to the common vertical beam 100.

At least one seal 168 (e.g., seal strip 180) may be sandwiched at least partially between the bottom face 18 of one or more panels 10 and the associated vertical beam(s) 100. For example, a seal strip 180 may be applied to the desired part of the bottom face 18 of the panel 10. The panel 10 may be thereafter be laid in position and pressed down onto the vertical beam(s) 100. At least one seal 168 (e.g., seal strip 188) may be sandwiched at least partially between the rear face 32 of one or more panels 10 and the front face 88 of at least one horizontal beam 84. For example, a seal strip 188 may be applied to the desired part of the rear face 32 of the panel 10 and the panel thereafter pressed into place against the horizontal beam(s) 84. At least one seal 168 (e.g., seal strip 205) may be sandwiched at least partially between the bottom face 18, or front face 30, of one or more panels 10 and the top face 91, or rear face 90, of at least one horizontal beam 84, respectively. For example, a seal strip 205 may be applied to the desired part of the panel 10. The panel 10 may thereafter laid in position and pressed into place against the horizontal beam(s) 84. At least one seal 168 (e.g., cap bead seal) may be provided over one or more seams 190, seams 106 and/or any seams formed between any caps 156 and one or more horizontal beams 84. In some embodiments, flashing 198 may be provided over the seam 190 formed between the rear edge 22 of each panel 10 and the associated horizontal beam(s) 84.

In many embodiments, the panels 10 (e.g., with seals 168, clamps 132, etc.) may be mounted on the panel mounting system 50 in a sort of weatherboard fashion from the bottom to the top of the area to be covered so the roof 12 is formed from the lower end 13 to the ridge 14, with each succeeding row 42 of panels 10 offset vertically relative the preceding row 42 and, if desired, without overlapping it. Such assembly method may be used to encourage liquid shedding off the roof 12 from upper to lower rows 42 of panels 10 generally across the top faces 16 thereof (e.g., and other outer surfaces and/or components of the panel mounting system 50 and roof 12) and eventually off the roof 12 without leaking through it.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Thus, embodiments of the present disclosure may have any one or more of the features described or shown in this patent. Moreover, the present invention includes additional features, capabilities, functions, methods, uses and applications that have not been specifically addressed herein but are, or will become, apparent from the description herein, the appended drawings and/and claims.

The methods described above or claimed herein and any other methods which may fall within the scope of the appended claims can be performed in any desired or suitable order and are not necessarily limited to any sequence described herein or as may be listed in the appended claims.

Further, the methods of various embodiments of the present disclosure may include additional acts beyond those mentioned herein and do not necessarily require use of the particular components shown and described herein, but are equally applicable with any other suitable structure, form and configuration of components.

While exemplary embodiments have been shown and described, many variations, modifications and/or changes of the system, apparatus and methods of the present disclosure, such as in the components, details of construction and operation, arrangement of parts and/or methods of use, are possible, contemplated by the patent applicant(s) hereof, within the scope of any appended claims, and may be made and used by one of ordinary skill in the art without departing from the spirit, teachings and scope of this disclosure and any appended claims. Thus, all matter herein set forth or shown in the accompanying drawings should be interpreted as illustrative, and the scope of the disclosure and any appended claims should not be limited to the embodiments described or shown herein.

The invention claimed is:

1. A method of forming a leakproof pitched wall or roof section with solar panels on an underlying subframe having multiple spaced-apart subframe members and upper and lower ends, each solar panel having a top face, front face at a front edge thereof and rear face at a rear edge thereof, the top face meeting the front face of each solar panel at a transition, the method comprising:
   mounting a panel support framework onto at least some of the subframe members;
   securing a first row of solar panels to the panel support framework closer to the lower end than the upper end of the subframe and extending angularly upwardly over part of the panel support framework;
   securing a second row of solar panels to the panel support framework between the first row of solar panels and the upper end of the subframe and extending angularly upwardly over part of the panel support framework;
   arranging the solar panels so that at least one panel on the second panel row is offset upwardly relative to at least one solar panel on the first row, wherein the solar panels are secured to the panel support framework without covering over 10% of the top face and transition of each solar panel;
   providing seals between the solar panels and panel support framework to prevent the leakage of liquid through the pitched wall or roof section formed by the solar panels; and
   allowing liquid to flow unimpeded from the top face of at least one of the solar panels on the second panel row and down onto the top face of at least one of the solar panels of the first panel row.

2. The method of claim 1 wherein each solar panel contacts or is secured to the panel support framework at, or proximate to, at least one interface, further including sealing each interface.

3. The method of claim 2 further including providing at least two seals at, or proximate to, each interface.

4. The method of claim 1 wherein the top face of each solar panel includes one or more photovoltaic portions for receiving sunlight, further including mounting the solar panels to the panel support framework so that none of the solar panels covers or overlaps the photovoltaic portion(s) of any of the other solar panels.

5. The method of claim 1 further including securing the solar panels to the panel support framework with a plurality of clamps without covering the transition of each solar panel.

6. The method of claim 1 further including at least one clamp extending over at least one solar panel along at least part of at least one side edge thereof and engaging the panel support framework.

7. The method of claim 6 further including providing at least one elongated seal between each clamp and each solar panel it secures to the panel support framework.

8. A method of forming a leakproof pitched wall or roof section with solar panels on an underlying subframe having upper and lower ends, the method comprising:
   mounting a panel support framework onto the subframe, the panel support framework including at least first and second angularly-oriented support beams extending at least partially between the upper and lower ends of the subframe, the second angularly-oriented support beam being linearly aligned with and offset upwardly relative to the first angularly-oriented support beam in a stepped fashion;
   securing a first row of solar panels to the panel support framework closer to the lower end than the upper end of the subframe and extending angularly upwardly over part of the panel support framework;
   securing a second row of solar panels to the panel support framework between the first panel row and the upper end of the subframe and extending angularly upwardly over part of the panel support framework, wherein each panel row includes at least first and second solar panels, the first and second solar panels of each respective row being positioned side-by-side, whereby a right side edge of the first solar panel and a left side edge of the second solar panel of the first panel row rest atop the first angularly-oriented support beam and a right side edge of the first solar panel and a left side edge of the second solar panel of the second panel row rest atop the second angularly-oriented support beam, each solar panel on the second panel row being offset upwardly relative to at least one solar panel on the first panel row in a stepped fashion;
   providing seals between the solar panels and panel support framework to prevent the leakage of liquid through the pitched wall or roof section formed by the solar panels; and
   allowing liquid to flow unimpeded from a top face of at least one of the solar panels on the second panel row and down onto a top face of at least one of the solar panels of the first panel row.

9. The method of claim 8 wherein each solar panel contacts or is secured to the panel support framework at, or proximate to, at least one interface, further including sealing each interface.

10. The method of claim 8 wherein the top face of each solar panel includes one or more photovoltaic portions for receiving sunlight, further including mounting the solar panels to the panel support framework so that none of the solar panels covers or overlaps the photovoltaic portion(s) of any of the other solar panels.

11. The method of claim 8 wherein each solar panel has a top face, a front face at a front edge thereof and a rear face at a rear edge thereof, wherein the top face meets the front face of each solar panel at a transition, further including securing the solar panels to the panel support framework with a plurality of clamps without covering the transition of each solar panel.

12. The method of claim 8 further including
at least one clamp extending over at least one solar panel along at least part of at least one side edge thereof and engaging the panel support framework, and
providing at least one seal between each clamp and each solar panel it secures to the panel support framework.

13. The method of claim 8 wherein each solar panel has a front face along the front edge thereof and a rear face along a rear edge thereof, further wherein the panel support framework includes at least one horizontally-oriented support beam having front and rear faces and extending at least partially between left and right sides of the subframe, further including
positioning at least a first solar panel of the first panel row so that its rear face abuts the front face of at least a first horizontally-oriented support beam, and
positioning the front edge of at least a first solar panel of the second panel row atop at least a portion of the first horizontally-oriented support beam.

14. The method of claim 13 further including
sandwiching at least one seal strip at least partially between the rear face of at least the first solar panel on the first row and the front face of the first horizontally-oriented support beam, and
sandwiching at least one seal strip at least partially between a bottom face of at least the first solar panel on the second panel row and the first horizontally-oriented support beam.

15. The method of claim 13 wherein at least one seam is formed between the rear edge of each solar panel on the first panel row and at least one horizontally-oriented support beam and at least one seam is formed between the front edge of each solar panel on the second panel row and at least one horizontally-oriented support beam, further including
providing a respective cap bead seal across each seam, and
extending flashing over the seam formed between the rear edge of each solar panel on the first panel row and the associated horizontally-oriented support beam(s).

16. A method of forming a leakproof pitched wall or roof section with solar panels on an underlying subframe having multiple spaced-apart subframe members and upper and lower ends, each solar panel having a front face at a front edge thereof, a rear face at a rear edge thereof and a top face meeting the front face at a transition, the top face having one or more photovoltaic portions for receiving sunlight, the method comprising:
mounting a panel support framework onto at least some of the subframe members;
with a plurality of elongated clamps, securely releasably clamping a first row of solar panels to the panel support framework closer to the lower end than the upper end of the subframe and extending angularly upwardly over part of the panel support framework;
with a plurality of elongated clamps, securely releasably clamping a second row of solar panels to the panel support framework between the first panel row and the upper end of the subframe and extending angularly upwardly over part of the panel support framework so that the solar panels on the second panel row is offset upwardly relative to the solar panels on the first panel row, whereby the solar panels are secured to the panel support framework without covering or overlapping the transition or photovoltaic portion(s) of any of the solar panels;
providing seals between the solar panels and panel support framework to prevent the leakage of liquid through the pitched wall or roof section formed by the solar panels; and
allowing liquid to flow unimpeded from the top face of at least one of the solar panels on the second panel row, down over the front edge of at least one of the solar panels on the second panel row and onto the top face of at least one of the solar panels of the first panel row.

17. The method of claim 16 wherein each solar panel contacts or is secured to the panel support framework at, or proximate to, at least one interface, further including sealing each interface.

18. The method of claim 16 further including
at least one elongated clamp extending over each solar panel along at least part of at least one side edges-thereof and engaging the panel support framework, and
providing at least one elongated seal between each elongated clamp and each solar panel it secures to the panel support framework.

19. A method of forming a leakproof pitched wall or roof section with solar panels on an underlying subframe having multiple spaced-apart subframe members and upper and lower ends, the method comprising:
mounting a panel support framework onto at least some of the subframe members, the panel support framework including at least first and second angularly-oriented support beams, each angularly-oriented support beam extending partially between the upper and lower ends of the subframe;
securing a first row of solar panels to the panel support framework closer to the lower end than the upper end of the subframe and extending angularly upwardly over part of the panel support framework;
securing a second row of solar panels to the panel support framework between the first panel row and the upper end of the subframe so that at least one panel on the second panel row is offset upwardly relative to at least one solar panel on the first panel row, each panel row including at least first and second solar panels;
positioning the first and second solar panels of the first panel row side-by-side;
positioning a right side-edge of the first solar panel and a left side-edge of the second solar panel of the first panel row over the first angularly-oriented support beam; and
providing seals between the solar panels and panel support framework to prevent the leakage of liquid through the pitched wall or roof section formed by the solar panels, the seals including at least one seal strip sandwiched at least partially between the first angularly-oriented support beam and the first solar panel of the first panel row along its right side-edge, and at least one seal strip sandwiched at least partially between the first angularly-oriented support beam and the second solar panel of the first panel row along its left side-edge.

20. The method of claim 19 further including
extending a first elongated clamp over at least part of the adjacent side edges of the first and second solar panels of the first panel row, and
securing the first elongated clamp to the first angularly-oriented support beam.

* * * * *